US009464006B2

(12) United States Patent
Zinn et al.

(10) Patent No.: US 9,464,006 B2
(45) Date of Patent: Oct. 11, 2016

(54) NANOPOROUS COATING SYNTHESIS AND APPARATUS

(71) Applicant: Lockheed Martin Corporation, Bethesda, MD (US)

(72) Inventors: Alfred A. Zinn, Palo Alto, CA (US); Justin S. Golightly, Belmont, CA (US); Loosineh Avakians, Burbank, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 191 days.

(21) Appl. No.: 14/248,204

(22) Filed: Apr. 8, 2014

(65) Prior Publication Data
US 2014/0220251 A1    Aug. 7, 2014

Related U.S. Application Data

(62) Division of application No. 13/466,992, filed on May 8, 2012, now Pat. No. 8,715,781, which is a division of application No. 12/420,792, filed on Apr. 8, 2009, now Pat. No. 8,257,826.

(51) Int. Cl.
*C04B 35/622* (2006.01)
*B64G 1/58* (2006.01)
*C04B 35/56* (2006.01)

(52) U.S. Cl.
CPC ........... *C04B 35/62222* (2013.01); *B64G 1/58* (2013.01); *C04B 35/5607* (2013.01); *Y10T 428/24997* (2015.04); *Y10T 428/249961* (2015.04); *Y10T 428/249974* (2015.04); *Y10T 428/249975* (2015.04); *Y10T 428/249976* (2015.04); *Y10T 428/249977* (2015.04);

(Continued)

(58) Field of Classification Search
CPC ................................ C04B 35/62222
See application file for complete search history.

(56) References Cited

U.S. PATENT DOCUMENTS 3,245,782 A * 4/1966 Ray .................... C22C 1/10
376/339
3,946,039 A     3/1976 Walz (Continued)

OTHER PUBLICATIONS

A Lost-Wax Approach to Monodisperse Colloids and Their Crystals Peng Jiang, Jane F. Bertone, and Vicki L. Colvin Science Jan. 19, 2001: 291 (5503), 453-457. [DOI:10.1126/science.291.5503.453.*

(Continued)

*Primary Examiner* — Alex A Rolland
(74) *Attorney, Agent, or Firm* — McDermott Will & Emery LLP

(57) ABSTRACT

An example of a nanoballoon thermal protection system includes a refractory ceramic foam having carbide balloons. The foam has a closed cell structure not allowing liquid to penetrate through the foam. Each of the carbide balloons is hollow and has a diameter greater than 0 nm and less than 900 nm. Each of the carbide balloons includes a refractory carbide. In addition, a vehicle with thermal shield includes a surface and a first and second nanoballoon closed cell foam coatings. Each of the foam coatings has a melting point temperature greater than 1000° C. and a density less than 85%. Each of the foam coatings has hollow balloons having a diameter less than 900 nm. Each of the foam coatings includes a closed cell structure not allowing liquid to penetrate through the respective coating. Methods for manufacturing a nanoballoon system and a nanoballoon thermal protection system are also disclosed.

17 Claims, 18 Drawing Sheets

(52) U.S. Cl.
CPC ............... *Y10T428/249978* (2015.04); *Y10T 428/249979* (2015.04)

(56) References Cited

U.S. PATENT DOCUMENTS

| | | | |
|---|---|---|---|
| 4,176,144 | A | 11/1979 | Schwab |
| 6,451,377 | B1 | 9/2002 | Paul et al. |
| 7,446,335 | B2 | 11/2008 | Kortshagen et al. |
| 7,520,933 | B2 * | 4/2009 | Park .................... C30B 5/00 117/68 |
| 8,257,826 | B1 | 9/2012 | Zinn et al. |
| 8,715,781 | B2 | 5/2014 | Zinn et al. |
| 2007/0178673 | A1 | 8/2007 | Gole et al. |
| 2008/0135721 | A1 | 6/2008 | Wang et al. |
| 2008/0233280 | A1 | 9/2008 | Blanchet et al. |
| 2011/0059321 | A1 * | 3/2011 | Skoog ..................... C04B 35/18 428/446 |

OTHER PUBLICATIONS

P.G. Li, M. Lei, W.H. Tang, Route to transition metal carbide nanoparticles through cyanamide and metal oxides, Materials Research Bulletin, vol. 43, Issue 12, Dec. 1, 2008, pp. 3621-3626, ISSN 0025-5408, 10.1016/j.materresbull.2008.01.016.*

Gibson, et al., "Thermal, electrical and acoustic properties of foams", Cellular solids, Structure and Properties, Second Ed., 1997, pp. 283-308, Cambridge University Press.

Jiang, et al., "A Lost-Wax Approach to Monodisperse Colloids and Their Crystals", Science, Jan. 19, 2001, pp. 453-457, vol. 291.

Lin, et al., "Thermoelectric properties of superlattice nanowires," Physical Review B, 2003, pp. 075304-1 through 075304-14, vol. 68, The American Physical Society.

Li, et al., "Route to transition metal carbide nanoparticles through cyanamide and metal oxides," Materials Research Bulletin, vol. 43, Issue 12, Dec. 1, 2008, pp. 3621-3626.

POWDERMET, printed on Oct. 8, 2009, http//www.powdermetinc.com/index.htm.

Schmitt, et al., "Infrared Properties of Reusable Surface Insulations," Process in Astronautics and Aeronautics,1974, pp. 183-204, vol. 35, the Massachusetts Institute of Technology.

Sun, et al., "Monodisperse FePt Nanoparticles and Ferromagnetic FePt Nanocrystal Superlattices," Science, Mar. 17, 2000, pp. 1989-1992, vol. 287.

SynFoam.TM. Syntactic Foams, printed on Oct. 8, 2009, http:///www.powdermetinc.com/synfoam.htm.

ULTRAMET—Advanced Material Solutions, printed on Oct. 8, 2009, http://www.ultramet.com.

Yang, et al., "Nanostructured Thermoelectric Materials: From Superlattices to Nanocomposites," 2005, Massachusetts Institute of Technology, Cambridge, MA.

* cited by examiner

Load filter with silica colloid → Pull vacuum → Filter dry for a packed film

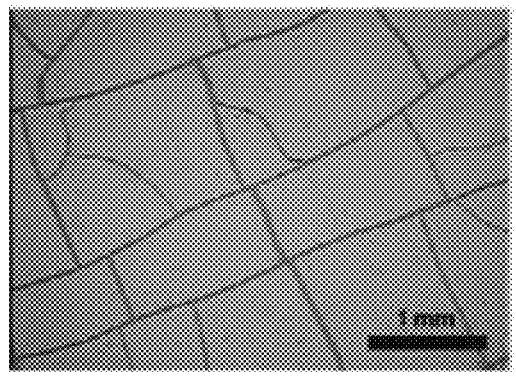
FIG. 5
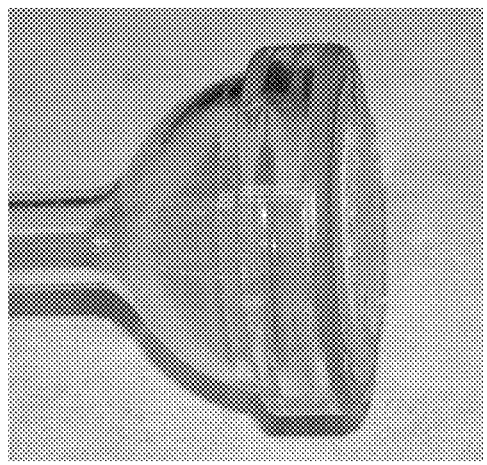 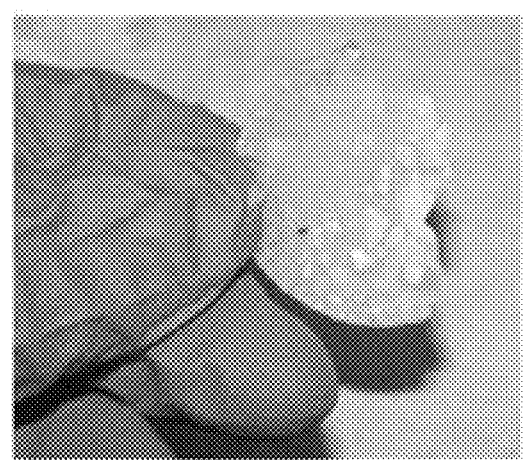
FIG. 6A          FIG. 6B

NANOPOROUS COATING SYNTHESIS AND APPARATUS

CROSS-REFERENCE TO RELATED APPLICATIONS

The present application is a divisional of U.S. patent application Ser. No. 13/466,992, filed on May 8, 2012 and now issued as U.S. Pat. No. 8,715,781, which is a divisional of U.S. patent application Ser. No. 12/420,792, filed on Apr. 8, 2009 and now issued as U.S. Pat. No. 8,257,826, each of which is incorporated herein by reference in its entirety for all purposes.

STATEMENT AS TO RIGHTS TO INVENTIONS MADE UNDER FEDERALLY SPONSORED RESEARCH OR DEVELOPMENT

Not Applicable.

FIELD

The subject technology relates generally to nanoparticles and foam coatings, and more specifically to nanoporous coating synthesis and apparatus.

BACKGROUND

Evolving national needs for Prompt Global Strike and Strategic Deterrence missions demand ever increasing performance out of the reentry bodies of tomorrow. Error-correcting and maneuvering payloads increase the flight time, heat flux and total heat experienced by the vehicle compared to their ballistic brethren. The missions today are tougher, require more accuracy, and demand tighter performance at impact conditions, all of which drive the requirements of the heat shield and control systems.

In many cases, the standard quartz/carbonphenolic material system traditionally used on reentry bodies have become too heavy due to increased thickness and are too conductive to prevent thermal soak-through during reentry. These systems relied on both the thickness of the heat shield and the material's ablation properties to keep the internal components within nominal temperatures. The significantly increased weight reduces overall system capabilities, affecting the total range and the missile system's payload carrying capability. Tile or blanket type insulation as found on the space shuttle cannot handle the high temperatures and frictional forces for this type of application. Metal thermal protection systems would be also too heavy. Accordingly, there is a need for a lighter alternative with higher temperature capabilities and better thermal insulation properties to meet these increased demands.

SUMMARY

According to one aspect of the disclosure, a method for manufacturing a nanoballoon system comprises: fabricating a packed structure of nanoparticles; creating a porous template; and producing nanoballoons.

In one aspect, the fabricating comprises filtration or centrifugation of nanoparticles. Each nanoparticle of the packed structure has a diameter greater than 0 nm and less than 1000 nm. In one aspect, the creating comprises: filling voids in the packed structure of nanoparticles; polymerization; and selectively removing the packed structure.

In one aspect, the producing comprises: preparing nanoballoon precursors; filling voids in the porous template with the nanoballoon precursors; and selectively removing the porous template. Each of the nanoballoons has a diameter greater than 0 nm and less than 1000 nm. Each of the nanoballoons are hollow, and the nanoballoons are agglomerated.

According to yet another aspect of the disclosure, a method for manufacturing a nanoballoon thermal protection system comprises fabricating a packed structure of nanoparticles. Each nanoparticle of the packed structure has a diameter greater than 0 nm and less than 1000 nm. The method further comprises creating a porous template and producing nanoballoons. Each of the nanoballoons has a diameter greater than 0 nm and less than 1000 nm. Each of the nanoballoons being hollow.

In one aspect, the method further comprises formulating a nanoballoon solvent mixture. The nanoballoon solvent mixture comprises the nanoballoons and a solvent. In addition, the method comprises consolidating the nanoballoons and producing a nanoballoon closed cell foam coating. The nanoballoon closed cell foam coating comprises a closed cell structure not allowing liquid to penetrate through the nanoballoon closed cell foam coating. The nanoballoon closed cell foam coating comprises the nanoballoons.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

FIG. 5 shows an example of cracks formed in a deposited film of nanoparticles in accordance with one aspect of the disclosure.

FIG. 6A shows an example of silica nanoparticles encased in a polymer fabricated in a filtration assembly in accordance with one aspect of the disclosure.

FIG. 6B shows an example of a section of a polymerized pellet in accordance with one aspect of the disclosure.

DETAILED DESCRIPTION

Figure 1A:
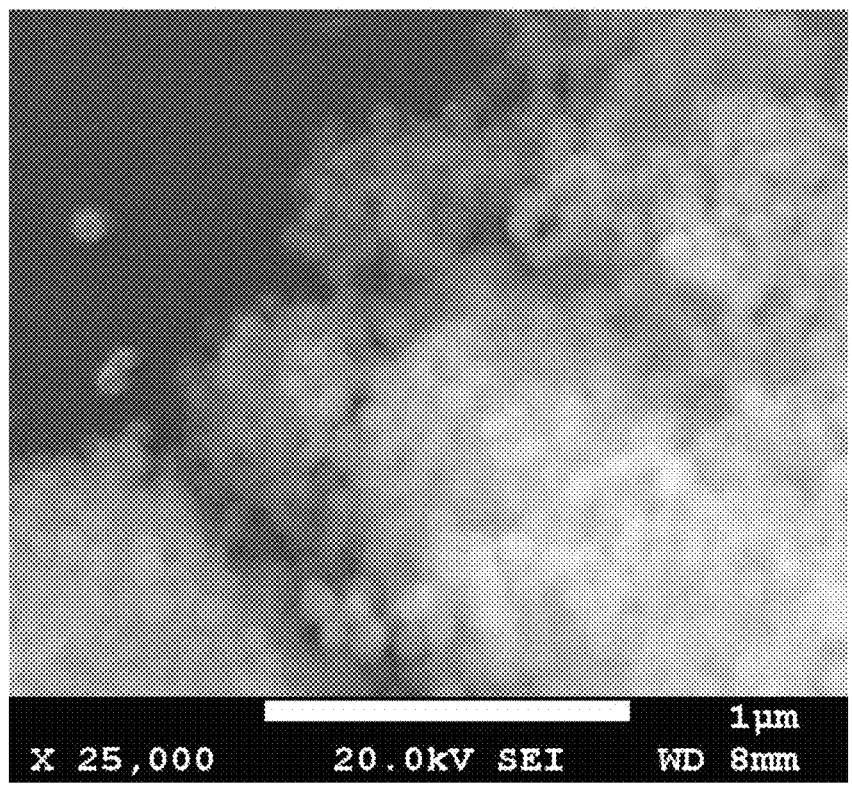
FIG. 1A shows an example of nanoparticles in accordance with one aspect of the disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

ACRONYMS

AFM—Atomic Force Microscopy
DSC—differential scanning calorimetry
ED—ethylene diamine
EDS—Energy Dispersive x-ray Spectroscopy
IPA—isopropyl alcohol
m.p.—melting point
NB—nanoballoon(s)
NBTPS—nanoballoon thermal protection system
RPM—revolution per minute
SEM—Scanning Electron Microscopy
T3G—triglyme
TBC—thermal barrier coating
TEA—tri-ethyl-aluminum, $Al(C_2H_5)_3$
TEM—Transmission Electron Microscopy
TEOS—TetraEthylOrthoSilicate
THF—tetrahydrofuran
TGA—thermogravimetric analysis
TPS—thermal protection system
XPS—X-ray Photoelectron Spectroscopy
XRD—X-ray Diffraction Overview Nanoscopic materials are of great interest for the potential they offer to manipulate and enhance properties and performance in many fields. Their low dimensionality is of particular interest for new thermal protection system (TPS) development since nanoscale heat transfer differs greatly from the respective bulk behavior and gives rise to new opportunities for technical advancement in the area of thermal insulation.

In particular, it has been shown that an increase in the number of interfaces gives rise to increased phonon scattering and a reduction in thermal conductivity. This is easily achieved by nano-structuring a material.

Currently, the fundamental issues involving nanoscale thermal transport across interfaces are being investigated in great detail and in a few cases already exploited such as in thermoelectric energy conversion. Of particular importance is that the physics of nanostructures allows independent tailoring of thermal and electrical conductivity, within certain bounds. This allows for great gains in ZT, the figure of merit for thermoelectrics. These gains demonstrate that through effective nanostructuring, a material's thermal conductivity can be reduced significantly.

Being able to tailor the thermal conductivity can lead to lighter thermal protection systems for a variety of aerospace products. Some examples include heat shields, high temperature aero-control surfaces, and wing leading edges. In one aspect of the disclosure, a nanoballoon thermal protection system can produce a lightweight, nanoporous thermal protection system that can withstand even the harshest of environments, including high heat flux and high oxidization regimes such as plasma during reentry.

In one aspect, the subject technology provides a suitable route to nanoballoon fabrication, and demonstrates scalability and manufacture test specimen to investigate the thermal conductivity of such a nanoporous material.

Experiments were conducted that scaled silica nanoparticle template formation from 10 mL to 2 L and dialed in the desired uniform particle size distribution in 100 nm diameter range and demonstrated the ability to recycle the solvents to reduce cost. In one aspect, a nanoparticle compaction method used centrifugation that increased the nanoballoon batch sizes from micro grams to several grams with further scalability and reduced this particular processing step from 5-10 days to 2 hrs.

The coating of polymer beads with titania was also investigated as an alternative approach. Titania nanoballoons were successfully fabricated via a template approach, and several techniques have been developed to achieve scale-up from micro-gram to multi-gram batches and to shorten processing compared to an original recipe from weeks to a few days. The accomplishments show that it is feasible to manufacture nanoporous thermal insulation on a large scale and at low cost.

According to one aspect of the disclosure, a nanoporous thermal protection layer, which may be referred to as a "nanoballoon thermal protection system" (NBTPS) or "nanoballoons" (NB) for short, may rely on the thermal insulation properties of the material itself during operation and tailorable high emissivity for maximum radiative cooling. No ablation is necessary or expected due to the high oxidation resistance of these refractory materials. Because of this, the correct material needs to be chosen for the operational environment as the material system needs to be able to withstand the peak surface temperatures and oxidation conditions (atomic oxygen plasma and partial pressure). Once the surface temperatures have been determined, the next step may be to choose the lowest density ceramic that can handle these conditions. The net result can produce a thinner heat shield, with reduced weight compared to traditional methods.

According to one aspect of the disclosure, nanoballoons are made via a solution chemistry approach that is easily scaleable and can be applied to formulate a paint-like liquid mixture. This allows the nanoballoons to be applied directly onto a substrate such as a metal substrate or a vehicle's structure (e.g., outer body or outer surface) via standard paint processes, such as spray-on and brush-on. The viscosity is easily tailored to meet specific needs. Once applied, the nanoballoons/structural substrate system undergoes a low temperature thermal treatment to fuse the coating together into a solid ceramic skin.

According to one aspect of the disclosure, the use of a variety of different ceramic nanofoam materials adjacent to each other (e.g., one type of material on the windward point, and a different type of material on leeward) and/or on top of each other to take advantage of a less dense material, but with lower maximum operating temperature, is no problem since such a foam structure exhibits excellent fracture toughness due to its inherent nanostructure. This suppresses crack propagation as well as demonstrate excellent thermal shock resistance due to the flexibility of the cell walls and its super-plastic deformability. The latter is due to the nanoballoons being able to slip with respect to each other without losing contact. This is similar to the phenomenon allowing ductility in metals; however, in this case, ductility is achieved using ceramic materials with much increased toughness. In addition, the system lends itself easily to the formation of graded coatings, allowing a seamless transition between two different materials. This transition of materials may be made side-by-side along a surface(s) (see, e.g., FIG. 19A) and/or may be made vertically on top of another material (see, e.g., FIG. 19B). For example, layering of porous insulation can be achieved by stacking vertically two different materials on a surface. In one example, a low temperature material such as a layer(s) of TiC (3140° C.) can be applied to a surface, and then a higher temperature material such as a layer(s) of TaC (3880° C.) may be placed on top of the layer(s) of TiC. This may result in a reduction in weight by more than 50% compared to an insulation layer comprising TaC only (without TiC).

In one aspect of the disclosure, nanoballoons are made via a template approach either generating a porous structure using silica nanoparticles and a polymer, removing the silica nanoparticles and coating the pore walls with the desired material. This results in hole-free nanoballoons. A second approach coats solid nanoparticles that need to be removed later on either by dissolving the core or calcination if the core can be burned out. In order to access the inside, open pores need to be present to access the inside leading to the formation of nanoballoons with holes or they can possibly burst when the internal gas pressure becomes too high. Diffusion through the shell might not be fast enough. However, the openings/holes are being closed during the fusion process when forming the coating. The former has been modified such that it is readily scaleable for mass production.

In one aspect of the disclosure, a nanoporous structure enables very high scatter and diffraction of the optical phonons radiating the heat back out into space. The latter together with tailorable emissivity to maximize emittance results in a very low thermal conductivity. At those high temperatures (>1000° C.), thermal heat transfer is mostly of radiative nature. This allows the use of a thinner thermal protection system leading to reduced weight. The nanoballoons can be applied directly to the vehicles outer surface (e.g., metal, carbon-carbon) via cost-effective spray-on methods. They are able to mechanically attach themselves by penetrating even the smallest cracks and voids. Further weight savings are achieved by being able to select from a variety of ceramics the lightest for a given temperature region and respective vehicle area. In addition, it can be used for propulsion environment applications and thermal barrier coatings for turbine blades. For the latter, it can form a very high temperature and abrasion resistance thermal barrier coating (TBC) enabling higher operating temperatures which result in higher efficiency.

In one aspect of the disclosure, a nanoporous closed cell refractory ceramic foam comprises refractory metals, refractory oxides and/or refractory carbides. The nanoporous structure mimics the structure of cork and synthetic polymer based foams, which are known to have one of the lowest thermal conductivities of any material (~0.03 W/m*K).

In another aspect of the disclosure, a nanoporous closed cell refractory ceramic foam comprises refractory carbide, such as the materials listed in Table 1 below. This table is not meant to be a complete list but simply shows examples of five refractory carbides which seem most suited for a targeted application due to their high m.p. and high oxidation resistance as well as high corrosion and abrasion resistance.

TABLE 1

| Matrix Material | Melting Point (C.) | Density (g/ccm) |
| --- | --- | --- |
| TaC | 3880 | 13.9 |
| HfC | 3890 | 12.2 |
| NbC | 3500 | 7.79 |
| ZrC | 3540 | 6.59 |
| TiC | 3140 | 4.93 |

In accordance with one aspect, the subject technology may produce a 50% dense foam material with nanoballoons/pores on the order of 100 nm in diameter and a wall thickness of about 10 nm. This indicates that the final product will be about 50% density of the bulk carbide material. Lower densities may further optimize the thermal properties.

In one aspect of the disclosure, techniques are described to fabricate and test small coupons to compare and validate the predicted performance of such nanostructured insulation with test data. The following activities have been conducted: evaluating available nanoballoon fabrication routes, downselecting the most promising approach, and fabricating a sufficient amount of nanoballoons so that test specimen can be made to investigate its insulating properties.

According to one aspect of the disclosure, some of the activities involving the subject technology include the following:

- Analyze nanoballoon synthesis approaches and downselect suitable ceramic materials system for nanoballoon test case. Some examples of ceramic materials include silica, titania, and zirconia.
- Perform nanoballoon synthesis by demonstrating manufacturability and scale-up potential, fabricating a sufficient amount for test specimen preparation, and characterizing the materials using instruments such as the following: X-ray Diffraction (XRD), Transmission Electron Microscopy (TEM), Scanning Electron Microscopy (SEM), and X-ray Photoelectron Spectroscopy (XPS).
- Fabricate test specimen by evaluating and downselecting between a coating or monolithic approach, e.g., TGA/DSC analysis to determine best compaction conditions and by fabricating test specimen.
- Determine insulative properties and compare to baseline by developing a test plan, evaluating and downselecting most suited test methods (e.g., flash diffusivity, coating on substrate (graphite, aluminum) and by identifying best baseline specimens for comparison (e.g., cork, shuttle tile, zirconia paper (fibrous sample), respective bulk material).

In one aspect, various techniques were used to develop a scalable manufacturing route to nanoporous insulation. These techniques reduced processing time and demonstrated several scale-up approaches.

According to one aspect of the disclosure, thermal properties can be baselined for a particular material (e.g. titania), and then material properties such as diameter and wall thickness can be adjusted to optimize thermal behavior. According to one aspect, the material composition of the nanoballoons may include metals, carbides, ceramics, or complex multilayer materials that exhibit better heat tolerance.

According to one aspect of the disclosure, the unique nanocellular structure minimizes thermal heat transfer in a variety of ways as discussed herein. These properties make this class of materials highly suitable for thermal protection systems and for simultaneously addressing the issues of solid conduction, convection and radiation heat transfer.

According to one aspect of the disclosure, the following process improvements have been identified:

- Plasma etch polymer film to improve silica/alumina accessibility
- Polymer removal within filter by sonication and vacuum filtration cycles
- Narrow size distribution of silica/alumina nanoparticles to improve packing structure
- Step-wise addition of colloid to filter to minimize cracking.

According to one aspect of the disclosure, the following have been performed or identified:

- Demonstrated size variability of nanoballoons
  100, 150, 160, 230 nm colloid
  Porous polymer templates made from 230 and 160 nm
  100 nm colloid deposition
- Plasma etch process identified
- Combination of sonication and vacuum filtration used Nanoballoon Thermal Protection System According to one aspect of the disclosure, a nanoballoon thermal protection system may be fabricated by (i) making (or synthesizing) nanoballoons (see, e.g., steps A1 through A3 below) and (ii) producing a foam coating using the synthesized nanoballoons (see, e.g., steps B1 and B2 below).

In one aspect of the disclosure, nanoballoons may be fabricated using the following procedure. This is also illustrated in FIGS. 20, 21A, 21B and 21C in accordance with one aspect of the disclosure.

Figure 7A:
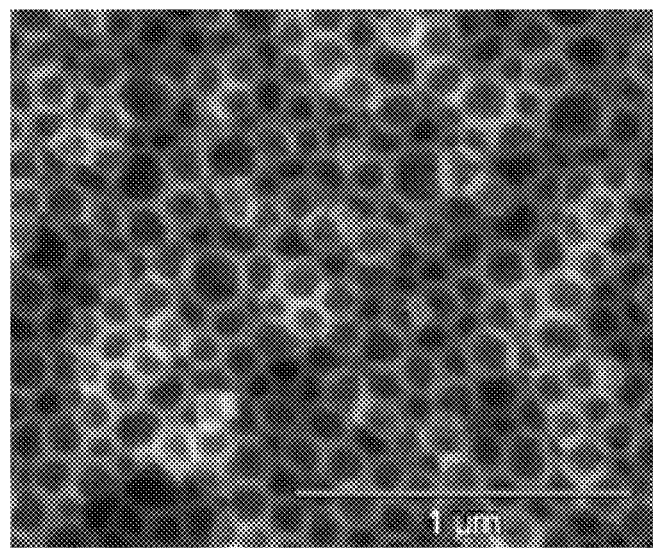
FIG. 7A is an example of an SEM image of a polymer template in accordance with one aspect of the disclosure.
Figure 7B:
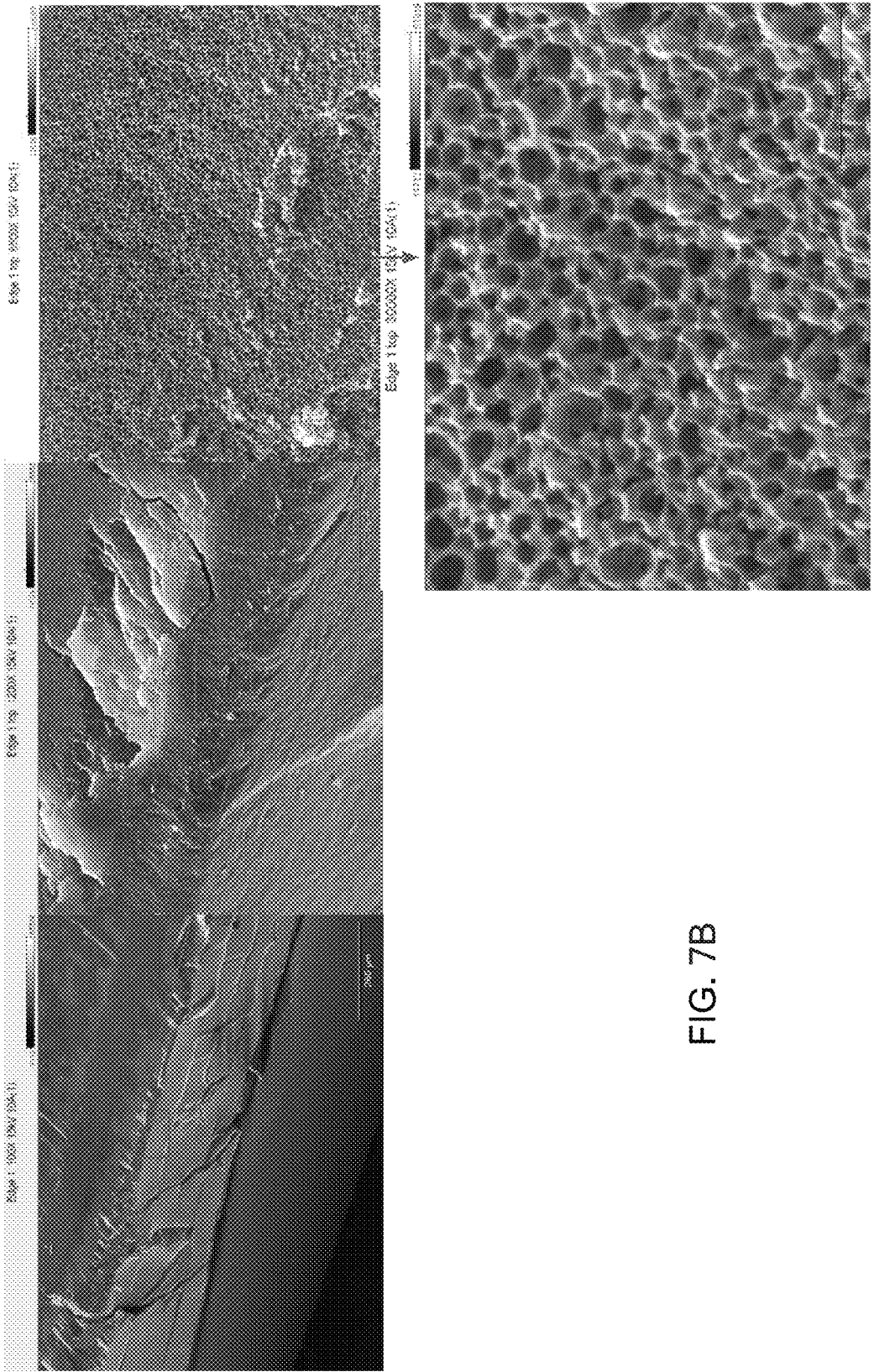
FIG. 7B shows another example of a porous polymer template at different magnifications in accordance with one aspect of the disclosure.
Figure 22:
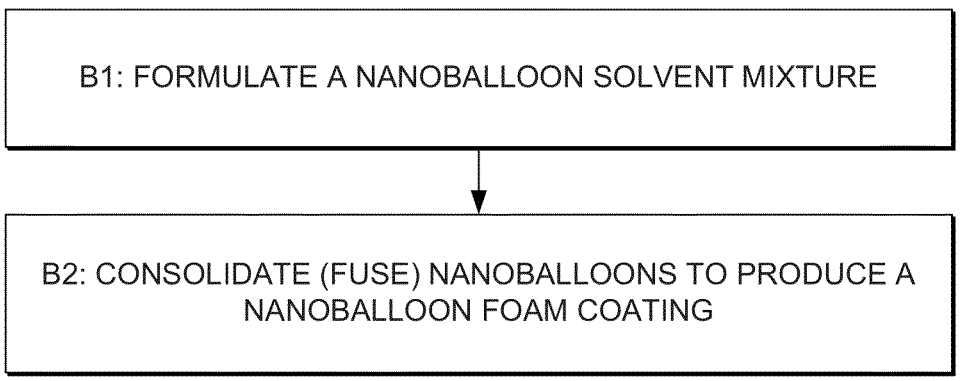
FIG. 22 illustrates an example of a flow chart for fabricating a foam coating in accordance with one aspect of the disclosure.

Step A1: Fabricate nanoparticles for a template (e.g., fabricate crystals of monodisperse nanoparticles for a template)
  Step A1-101: Synthesize nanoparticles (e.g., monodisperse nanoparticles)
  Step A1-102: Form a packed structure of nanoparticles (e.g., nanoparticle crystal). FIG. 1A shows an example of nanoparticles.
Step A2: Create a porous template (polymer template)
  Step A2-101: Fill the voids in the packed structure of nanoparticles with monomer
  Step A2-102: Polymerize monomer
  Step A2-103: Etch polymer film to expose nanoparticles
  Step A2-104: Selectively etch nanoparticles, leaving voids (e.g., leaving a polymer template with uniform spherical voids). FIG. 7A shows an example of a polymer template. FIG. 7B shows another example of a porous polymer template at different magnifications. The lowest magnification is shown at the left, and the highest magnification is shown at the bottom right.
Step A3: Produce nanoballoons (e.g., form nanoballoons using a nanoparticle-based template)
  Step A3-101: Prepare nanoballoon precursors
  Step A3-102: Fill the voids in the template with the nanoballoon precursors
  Step A3-103: Decompose precursors to deposit, for example, metal or ceramic phase onto the pore walls
  Step A3-104: Selectively remove the polymer template In one aspect of the disclosure, a foam coating may be fabricated as follows using the nanoballoons made from Steps A1 through A3. This procedure is also illustrated in FIG. 22.

Step B1: Formulate a nanoballoon solvent mixture (e.g., paint-like nanoballoon/solvent mixtures for spray-on for easy nanoballoon application)
  In one aspect, layering of the porous insulation may be utilized (see, e.g., FIG. 19B). For example, a low melting point temperature material such as TiC (3140° C., 4.93 g/cm3) can be deposited on a surface first, followed by a higher melting point temperature material such as TaC (3880° C. 13.9 g/cm3) on the TiC layer(s), allowing for additional weight savings, since TiC is about one third of the weight of TaC.
Step B2: Consolidate (fuse) nanoballoons to produce a nanoballoon foam coating. For example, consolidate nanoballoons into a coherent closed nanopore coating which is bonded to the substrate and each other. Consolidated (or fused) nanoballoons may look similar to what is shown in FIG. 7B.

In one aspect, nanoballoons (made from Steps A1 through A3) such as carbide nanoballoons can be converted into a coherent foam coating using Steps B1 and B2.

According to one aspect of the disclosure, Steps B1 and B2 may be carried out as follows after completing Steps A1 through A3.

According to one example, once the surfactant protected nanoballoons such as carbide nanoballoons have been fabricated, they are dispersed in suitable solvents such as ethanol, IPA, THF, or a water based mixture. The viscosity is easily controlled via the nanoballoon concentration (e.g., 400-5000 cP up to paste-like consistency). After drying, the nanoballoons are fused and bonded to the substrate (e.g., a structure made of aluminum or fiber reinforced composite) by rapid thermal annealing to preserve the nanoporous structure. In one aspect, this can be done using suitable commercially available high power heating lamps (commonly used in the industry for such purposes), lasers, or an open flame. It is suggested that an open flame is used only for water based systems to avoid explosions and fires. Due to the small size, the nanoballoons bond to each other at a much lower temperature than the materials' melting point. Once they have fused, they assume bulk properties, while retaining the nanoporous structure.

According to one aspect of the disclosure, cracks and voids can be patched up and repaired in the same manner, since the nanoballoons bond well to the surface due to its relative high surface activity. A roughened surface allows the nanoballoons to mechanically hold onto the surface, since the small size allows them to penetrate very small voids, scratches and pits.

In accordance with one aspect of the disclosure, one advantage of a foam coating of the subject technology is that it does not require a matrix of bonding material to bond the nanoballoons. In a microfoam, micron size hollow spheres require a matrix to bond them together resulting in a higher thermal conductivity (than that of the subject technology) due to the higher solid content (than that of a foam coating of the subject technology) and heavier and higher processing temperature as well as applicability limits use. In one aspect, nanoballoons of the subject technology can be directly bonded together at relative low temperatures eliminating the need for an additional matrix material. In one aspect, a foam coating of the subject technology is better than a microfoam that exhibits oxidation resistance to about 1650° C., with a thermal conductivity as low as 0.08 W/m*K at room temperature, high compressive strength in excess of 1500 psi, and densities as low as 0.15 g/cm$^3$.

Nanoballoon Synthesis According to One Aspect of the Disclosure

According to one aspect, Step A1-101 may be carried out as follows:
Synthesize Silica Spheres
Clean all glassware thoroughly prior to use
  Clean with acid
Add ethanol to reaction vessel
Add 30% ammonium hydroxide
Add tetraethylorthosilicate (TEOS)
Stir overnight
Purify silica spheres
Centrifuge 8500 RPM for 1 hr
Remove supernatant
Add ethanol
Sonicate with tip sonicator
Repeat two times According to another aspect of the disclosure, the silica sphere template can be replaced by an alumina sphere template. The alumina nanospheres can be made in a similar fashion using aluminum ethoxide or other alkoxide.

According to one aspect, Step A1-102 may be carried out as follows. Form polymer-encased silica film using one of the following methods:
Filtration method
  Use 20 nm porous alumina filter
  Allow silica film to dry
  Add monomer solution to silica film
  Place in vacuum oven in nitrogen atmosphere overnight
Centrifugation method
  Prepare concentrated colloid solution by adding less ethanol during purification
  Centrifuge 8500 RPM for 2 hrs
  Remove supernatant
  Remove and dry pellet
  Wet pellet with monomer solution and place in oven
Double press method for particle compaction
  A further variation of nanoparticle compaction in preparation of the polymer template formation is the use of active compression of the solution containing the nanoparticles.
  The latter is placed between two nanopore filters (~20 nm size pores) and one pushed down so that the solution can escape through both filters compacting the particles between them.
  This works well for larger particles >180 nm and is readily scalable to form large flat specimen sheets that makes the etching and infiltration steps easy.
  For smaller particles, the centrifuge method described above is understood to be a preferred method. The so formed "cake" is ready for the polymer infiltration and curing step.

According to one aspect, Step A2-103 may be carried out as follows:
Etch thin polymer film of encased silica spheres with oxygen plasma
Break up pellets into smaller pieces to create large fracture surfaces that expose the silica spheres for ready dissolution (ready etch agent access)

According to one aspect, Step A2-104 may be carried out as follows:
Soak polymer film (polymer template) in 2% HF solution for 2 hrs up to overnight
Wash with distilled water
Wash with ethanol
Dry film (polymer template)

According to one aspect, Steps A3-101 and A3-102 (nanoballoon precursor formation and filling voids in the template) may be carried out as follows for TiO$_2$:
Prepare solution for insertion into porous film (polymer template)
For TiO$_2$, use 1 M titanium ethoxide solution
Dip porous film (polymer template) into nanoballoon precursor solution
Dry film (polymer template)
Repeat 3 to 30 times According to another aspect, Steps A3-101 and A3-102 may be carried out as follows for inserting Titania precursor:
Precursor: titanium tetraethoxide
1M solution in ethanol
0.5 M solution
Drop coat method
  Several aliquots added to sample in a drop wise fashion
Dip-coat method Dip porous film (polymer template) into solution and allow capillary action to fill voids Concentration effects Ti(OC$_2$H$_5$)$_4$ concentration changes affect nanoballoon thickness Concentration changes affect oxidation rates and precursor permeability into porous film (polymer template) due to viscosity increase with increasing concentration According to one aspect, Step A3-103 (removal of polymer template) may be carried out as follows:

Solvent

Dissolve polymer (polymer template) in appropriate solvent

Rinse with ethanol or appropriate solvent

Heat

Remove polymer (polymer template) by heating to 450° C.

According to one aspect, Step A3-101 (nanoballoon precursor synthesis) may be carried out as follows:

Step A3-101: Fabricate nanoballoon precursors

Step A3-101a: Fabricate metal (e.g., Ta) nanoparticles

Step A3-101b: Convert to a carbide (e.g., TaC) at low temperature

These steps may be followed by Steps A3-102, A3-103, B1 and B2.

Nanoballoon Synthesis According to Another Aspect of the Disclosure

Template Approach

One approach for synthesizing nanoballoon structures (or hollow nanoparticle formation) utilizes a template synthesis technique. The template approach can offer the most flexibility in particle size, composition, and nanoballoon wall thickness, potentially resulting in highest control over strength, density, and insulating properties.

A template method is a multi-step method that allows tailorable hollow nanostructure synthesis. The first step in the template method is to fabricate monodisperse silica nanoparticles (very narrow size distribution). The silica nanoparticles are then deposited onto a substrate, where they form an ordered compacted arrangement ("crystal" like). A pre-polymer or monomer solution is added, which infiltrates the "crystal". The solution is polymerized to fill the void space between the nanoparticles, thus the ordered crystal is encased in polymer. The polymer/nanoparticle composite film is then etched with hydrogen fluoride (HF), which removes the silica nanoparticles but does not destroy the polymer. The polymer film becomes a template of interconnected voids/pores. The porous polymer is then filled with precursor solution that adheres to the polymer walls. The precursor solution then reacts to form the materials which become the nanoballoon shell. The final step is removal of the polymer template by either chemical or thermal treatment.

According to one aspect of the template method, nanoballoons of a variety of materials (e.g., Ni, TiO$_2$, ZrO$_2$, Al$_2$O$_3$, SiO$_2$, CoO, chalcogenides) can be synthesized. In one example, nanoballoons may include Ni, TiO$_2$, or ZrO$_2$/Al$_2$O$_3$ 150-300 nm diameter hollow spheres. In one aspect, a colloidal crystal template can be formed, for example, with SiO$_2$, then the voids are filled with a polymer such as PMMA to form a nanoporous polymer template, and finally, the desired material is developed on the inside of the pores. In the example, the template is on the outside and is easily dissolved to isolate the nanoballoons. This method can result in very narrow size distributions.

An example of a template method for producing nanoballoons is provided below in Table 2.

TABLE 2

| 1 | Fabricate silica nanoparticles (~100 nm) |
| 2 | Form ordered "crystal" arrangement |
| 3 | Infiltrate with polymer to build negative template |
| 4 | Remove silica nanoparticles with HF |
| 5 | Grow nanoballoons in the voids |
| 6 | Dissolve polymer and isolate nanoballoons |

As described above, a method of nanoballoon synthesis may include the following steps:

Step A1: Fabricate nanoparticles for a template (e.g., fabricate crystals of monodisperse nanoparticles)

Step A2: Create a porous template

Step A3: Produce nanoballoons

An example of Steps A1, A2 and A3 is described below according to one aspect of the disclosure.

Step A1: Fabricate Nanoparticles

Step A1-101: Silica Template Nanoparticle Synthesis

A number of methods were investigated to fabricate silica nanoparticles with a narrow size distribution. Different synthesis methods are required based upon the desired size regime. In one example, 100-150 nm nanoballoon size was targeted.

The decision to target this size regime was based upon thermal transport understanding, and structural integrity assumptions. Having structures in this size regime are expected to improve thermal dissipation and offer a better protection system.

A method of fabricating nanoparticles of median sizes from 90 nm to 250 nm is described in Table 3, which shows synthesis of silica nanoparticles followed by a purification by centrifugation.

TABLE 3

| Synthesize silica spheres |
| --- |
| Clean all glassware thoroughly prior to use - |
| Clean with acid |
| Add ethanol to reaction vessel (e.g., 100 mL) |
| Add 30% ammonium hydroxide (e.g., 8 mL) |
| Add tetraethylorthosilicate (TEOS) (e.g., 8 mL |
| Stir overnight |
| Purify silica spheres |
| Centrifuge 8500 RPM for 1 hr |
| Remove supernatant |
| Add ethanol |
| Sonicate with tip sonicator |

Table 3 describes a method that was used for the synthesis and purification of silica nanoparticles. The example quantities given represent an early recipe used to synthesize 150 nm SiO$_2$ particles. Subsequent reaction modifications were made by changing the amounts of ammonium hydroxide and TEOS relative to the ethanol concentration. The ethanol, water, ammonium hydroxide, and TEOS concentrations affect the nanoparticle formation dynamics, and the size is tailored by adjusting these factors. The details of the experiments carried out can be found in Table 4.

TABLE 4

| ID | Silica Batch | Particle Size | Amount used | Processing | Analysis | Result/Observation |
|---|---|---|---|---|---|---|
| SSI | | N/A | | | | |
| SSIA | | N/A | | | | |
| SSIIA | | N/A | | | | |
| SSIIB | | 109 nm | | | | |
| SSIII1 | | 109/90 nm | | | | |
| SSIII2 | | N/A | | | | |
| SSIII3 | | 158/162 nm | | | | |
| SSIV1 | | 152 nm | | | | |
| SSIV2 | | 44 nm | | | | |
| SSIV3 | | 250 nm | | | | |
| SSV1 | | 90 nm | | | | |
| SSV2 | | 100 nm | | | | |
| SSVI | | 94 nm | | | | |
| SSVII | | 135 nm | | | | |
| SSVIII | | 145 nm | | | | |
| SSIX | | 164 nm | | | | |
| SSX | | ~300 nm | | | | |
| SSXI | | | | | | |
| SSVI A PS | | | 10 mL colloid, 10 g Styrene | Vacuum oven polymerization | Visual | Too little material, poor polymerization |
| SSIV3 PS | | | | PS polymerization on filter deposited silica | SEM | |
| SS? POR | SSIV3 | likely | | HF etch of filter deposited spheres Filter deposition with more colloid - 40 mL | | |
| SSIII3 B | | | | | | |
| SSIII3 PS | | | | | | |
| SSIV TiO2 | | | | Added TiO2 precursor to film drop-wise | Visual/ SEM | Dropwise methods works, but TiO2 buildup too much-use dip coat method in future |
| SSIII3 POR | | | | | | |
| SSIV3 & SSIV1 | | | | TiO2 dip coat | visual | Wetting looks better, more controlled |
| SSIV1 PS | | | | | | |
| SSIV3 POR | | | | HF etch of filter deposited spheres | SEM | Porous structure present, but polymer film inhibits - use plasma etch to improve process |
| SSVI | | | | Filter dep | | Purified and unpurified samplers were deposited onto filters - unpurified samples did not polymerize well |
| SSVII A PS | | | | | | |
| SSVII B PS | | | | | | |
| SSVII C1 & C2 PS | | | | PS Polymerization of C2 | | |
| SS? PE | | | | Plasma Etch 15% CF4 in O2 | | Good etching results, ~80% polymer film removal |
| SSIV1 POR | | | | | | |
| SSVII C | | | | | | |
| SSVII P1 A&B | | | 2 4X pellets | PS Polymerization on microscope slide | Monomer too volatile | Pellets did not polymerize |
| SSVII P1 C&D | | | 2 4X pellets | PS Polymerization in Plastic Weighing boat | Boats not tolerant to styrene at 70° C. | Boat integrity lost - no polymerization |
| SSVII TiO2 | | | | | | |
| SSVII D1 | | | | Filter deposition | | |
| SSIX B | | | | Filter deposition | | |
| SSIX C | | | | Filter deposition | | |
| Al Boat | | | | | | Aluminum boats work for polymerization |
| SSIX P2 PS | | | 1 4X pellet | PS polymerization | | Mostly polymerized - not fully sealed |
| SSIX P1 PS | | | 1 4X pellet | PS polymerization | | Soft and Gooey |
| | | | 1 4X pellet | | | Soft and Gooey - became hard |

TABLE 4-continued

| ID | Silica Batch | Particle Size | Amount used | Processing | Analysis | Result/Observation |
|---|---|---|---|---|---|---|
| SSVII P1 PS | | | | PS polymerization | | after vac oven for additional day |
| SSIX C PS | | | | PS polymerization | | |
| SSIX D & E | | | | Filter deposition | | |
| SSVII P2 POR | | | | | | |
| SSIX P3 | | | 1 4X pellet | PS Polymerization | | Switch to 4% benzoyl peroxide to Improve polymerization - too much evaporated - poor seal formation<br>Added ethanol to test hydration effect - expanded and fell apart -- need to have sufficient cracks to allow for hydration expansion during polymerization |
| SSIX F | | | | Filter deposition | | |
| SSIX P4 | | | | | | |
| SSIX P5 test | | | | | | Weight of pellets 2.5-3 g |
| SSIX P2 PE | | | | Plasma Etch of Polymer film | | 20% CF4 appears to be too aggressive, or the 20 min total time was too much |
| Tube polymerization | | | | | | |
| SSIX P4 PS | | | | | | Polymer looks good |
| SSIX G & H | | | | | | |
| SSX A PS | | | | PS Polymerization | | Styrene leaked from side of filter apparatus |
| SSX B & C PS | | | | | | |
| SSVII P1 PS POR | | | | HF Etch | 2 times at 2% | |
| SSIX G & H POR | | | | 4% HF Etch | | |
| SSIX P2 TiO2 | | | | TiO2 Deposition | | 1 M Titanium tetraethoxide in EtOH dip coated 3X w/30 min dry time |

Once the reaction has gone to completion, the colloid is purified by centrifugation. The process involves repetitive steps to remove the remaining ammonium hydroxide, unreacted TEOS, incomplete reaction products, and other impurities. The purified colloid is relatively stable and is stored in Nalgene containers.

Figure 1B:
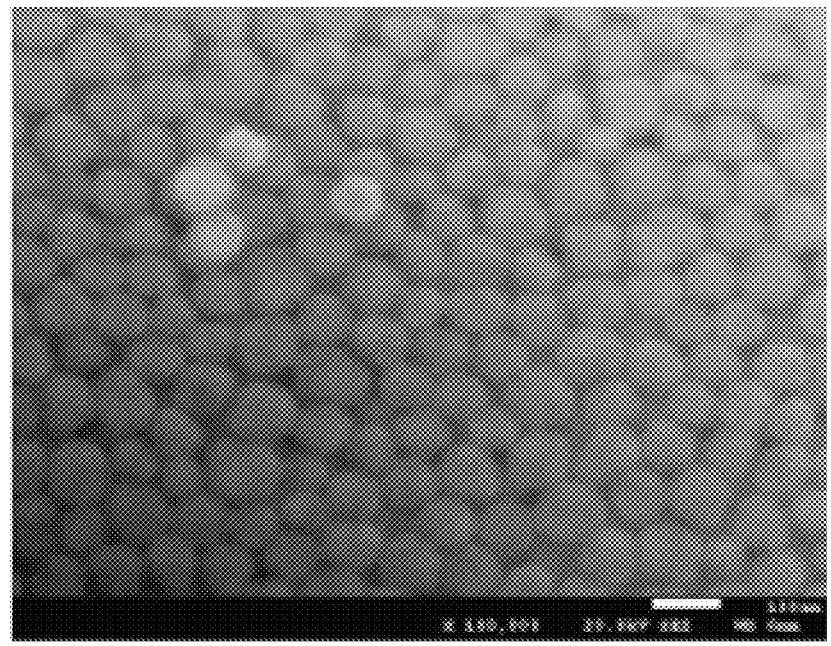
FIG. 1B shows an example of an SEM image of deposited silica nanoparticles in accordance with one aspect of the disclosure.

FIG. 1B shows an example of an SEM image of deposited silica nanoparticles. Silica nanoparticles that have been deposited onto a silicon wafer surface are captured in this image. The nanoparticles used for the SEM analysis were designed to be about 100 nm diameter particles. The samples were deposited onto a silicon wafer by capillary action. The wafer was partially dipped into colloid and nanoparticles wicked onto the wafer, where they deposited above the colloid solution. Subsequent depositions were performed using filter deposition or by centrifuging to form a compacted pellet.

In FIG. 1B, the particle size distribution of the silica nanoparticles is narrow but is broad for uniform packing. This is important for reliable polymer structure.

According to one aspect of the disclosure, the size control depends on synthesis parameters, as outlined below.

Size and size distribution are controlled by the interaction of four concentrations
  Ethanol, water, ammonium hydroxide, TetraEthylOrthoSilicate (TEOS)
  The concentrations are interdependent, meaning adjustment of one factor does not necessarily yield the desired monodisperse nanoparticles.

Narrow size distributions of nanoparticles from 100-250 nm have been fabricate

Figure 2:
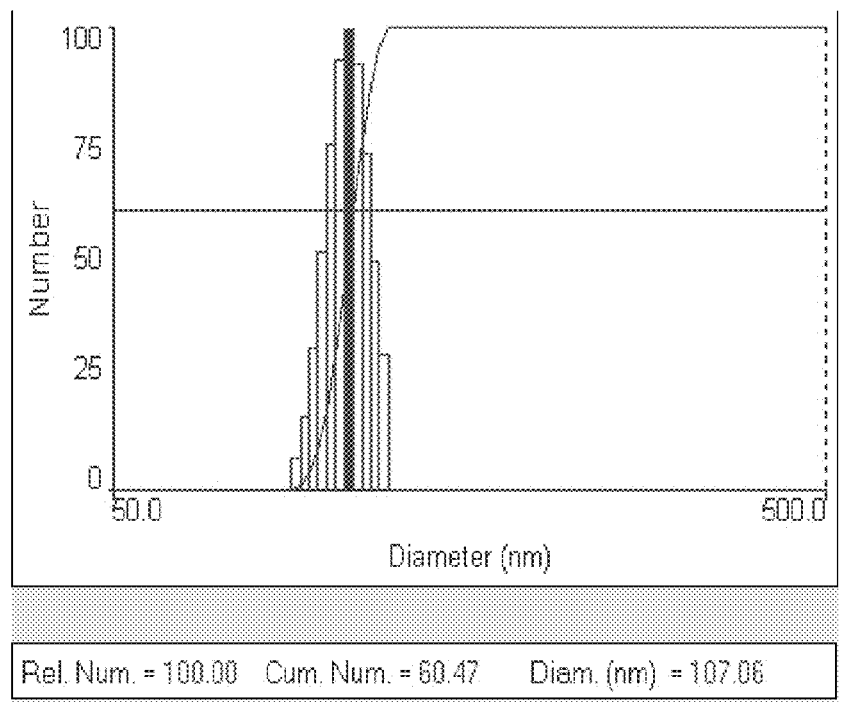
FIG. 2 is an example of a histogram of the size distribution of synthesized nanoparticles in accordance with one aspect of the disclosure.

The image shown in FIG. 2 is an example of a histogram obtained from the Brookhaven Instruments Corporation Zeta Phase Analysis Light Scattering (PALS) instrument (Zeta Potential Size Analyzer) and shows complimentary information to the SEM image. The size distribution of the synthesized nanoparticles shows a median diameter of 107 nm. The size distribution data obtained from the Zeta PALS instrument demonstrates the ability to obtain useful information about the median size and the size distribution of synthesized nanostructures. The Zeta PALS instrument is located in the same lab as the synthesis is conducted in, and size distribution can be monitored as the reaction progresses. The instrument is capable of determining size distribution, electrophoretic mobility, and surface charge. $SiO_2$ nanoparticles are characterized using bulk silica properties such as density and index of refraction. Using these properties, the instrument provides a direct method to obtain size information and surface properties.

Silica colloid as prepared has several impurities that need to be removed prior to use in a polymer matrix. Impurities such as unreacted precursors, incomplete reactants, and residual ammonium hydroxide can be removed by centrifugation. Especially the latter interferes with the polymerization and caused processing issues during scale-up. When centrifuged at high speeds for an extended period of time, the nanoparticles in solution are compacted at the bottom of a centrifuge tube. The time and speed required to compact the nanoparticles is dependent upon the size of the particles, their density, and the solvent medium. In one aspect, typical centrifuge speeds were 8500 RPM using the Sorvall Super T-21 centrifuge. The Sorvall is set up for 50 mL tubes, and can centrifuge eight tubes at once. The centrifuge was refrigerated to prevent the particles from fusing during the centrifugation process. After centrifuging for the typical one hour period, the supernatant was decanted and discarded.

The remaining nanoparticle gel was then re-suspended into a fresh solution of ethanol by sonicating with a tip-sonicator.

The Branson Digital Sonifier tip-sonicator imparts a great deal of energy into the solution, which causes it to heat rapidly. To prevent overheating, the samples were sonicated at 30% amplitude for no longer than 30 second increments. Two increments were sufficient to disperse the nanoparticles on several occasions, but there were instances where 2-3 additional sonication steps were required to break up portions of the pellet remaining at the bottom of the centrifuge tube. Centrifuging and subsequent re-suspension by sonication represented one cycle of the purification process. The purification process generally required three cycles. After the third cycle, the solutions were combined to produce a concentrated colloid solution. The purified colloid is concentrated in the final purification step to a relative concentration of four times the original synthesis concentration. If ammonia odor was present at this point, additional purification cycles were performed until no noticeable ammonia was observed.

Scale Up.

Initial colloid synthesis experiments were performed in small volumes, to gain an understanding of the synthesis parameters and how they affect size, distribution and stability. The silica synthesis process was scaled up step-wise to adjust for deviations that occur when the reaction size is increased. Changes in reaction conditions are primarily associated with mixing dynamics, and these affect pH and particle-particle interactions governing growth, stability, and uniformity. Concentrations of reagents were adjusted to maintain a consistent and predictable nanoparticle product size. The batch size was increased from initial tests of 10 mL to final volumes of 2 L consistently produced. The methods described herein that have been used to successfully produce a synthesis volume increase 200× can be used to further raise synthesis volumes for larger scales.

Solvent Recycling.

In order to reduce waste and save cost, a solvent reclamation procedure was implemented. The purification process uses a large quantity of high purity ethanol. Decanted supernatant from the centrifuge cycles was collected and stored for recycling. The supernatant is predominately ethanol with ammonium hydroxide, water, silica and TEOS present. The ethanol mixture was run through a distillation column where the ethanol azeotrope was collected. The reclaimed ethanol was then used in subsequent purification steps.

Step A1-102: Silica Template Nanoparticle Compaction

According to one example, deposition of silica nanoparticles into ordered structures was carried out in three different ways: (1) via capillary forces, (2) filtration, and (3) centrifugation. All three methods are useful, but for scale-up potential they are listed in order of improving utility. In one aspect, a preferred method is centrifugation, and the next preferred method is filtration. The capillary deposition technique worked well for small samples, but is not feasible for significant quantities of material, since it requires 5-10 days to settle and produces only micron thick layers. The filtration method works well for providing a uniform film of nanoparticles a few mm thick. To provide a larger quantity, a compacted pellet was formed by centrifuging the purified colloid for two hours at high speeds and turned out the fastest and most efficient approach.

(1) Compaction Via Self-Organizing Capillary Forces

Ordered nanoparticle crystals were assembled onto a substrate by using capillary forces to draw colloidal nanoparticles onto the surface. Glass and silicon surfaces were cleaned with a hydrochloric acid treatment prior to deposition. The freshly cleaned substrate was partially dipped into a colloidal solution of silica nanoparticles. Capillary forces draw the liquid onto the substrate, where it dries and deposits the nanoparticles onto the surface. The natural forces arrange the nanoparticles into a well-ordered crystal. This technique was successful in that it worked for deposition of nanoparticles; however, it works for small areas and does not provide opportunity for large quantities of material to be deposited into an ordered structure.

(2) Compaction Via Filtration

Figure 3:
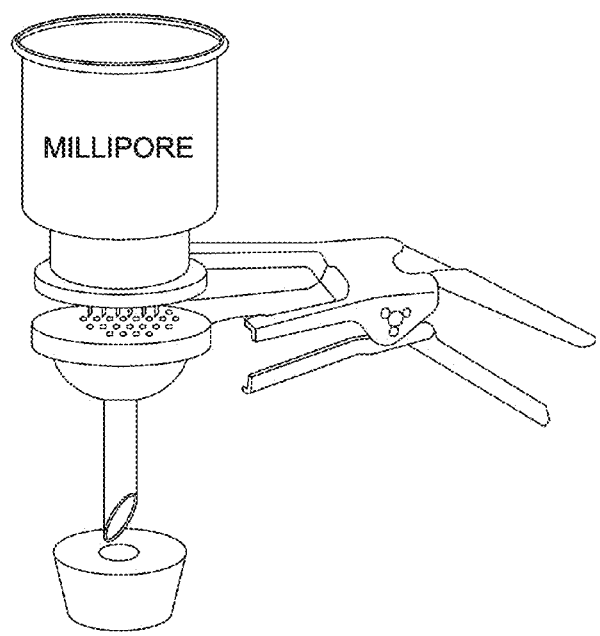
FIG. 3 shows an example of an image of an apparatus used for the filtration in accordance with one configuration of the subject technology.

In one example, the purified colloid film deposited on a filter yields a film approximately two inches in diameter, with a varying thickness of a few mm. FIG. 3 shows an example of an image of the apparatus used for the filtration in accordance with one configuration. The filter assembly fully assembled contains a ceramic filter with a well defined pore size located between the top section and the glass frit; the assembly is held together by the clamp shown on the right in FIG. 3. The concentrated colloid is filtered in the vacuum filter apparatus. Whatman filters with a diameter of 4.7 cm and a pore size of 20 nm are used for the filtration. This is the smallest pore size that effectively allows the solution to pass through. It is also a requirement that the pore size be small enough to prevent the nanoparticles from blocking the pore sites or passing through into the filter. A typical volume of colloid for a single filtration is 20-40 mL of colloid. In FIG. 3, the filtration assembly is used to collect a well-ordered film of silica nanoparticles.

Figure 4:
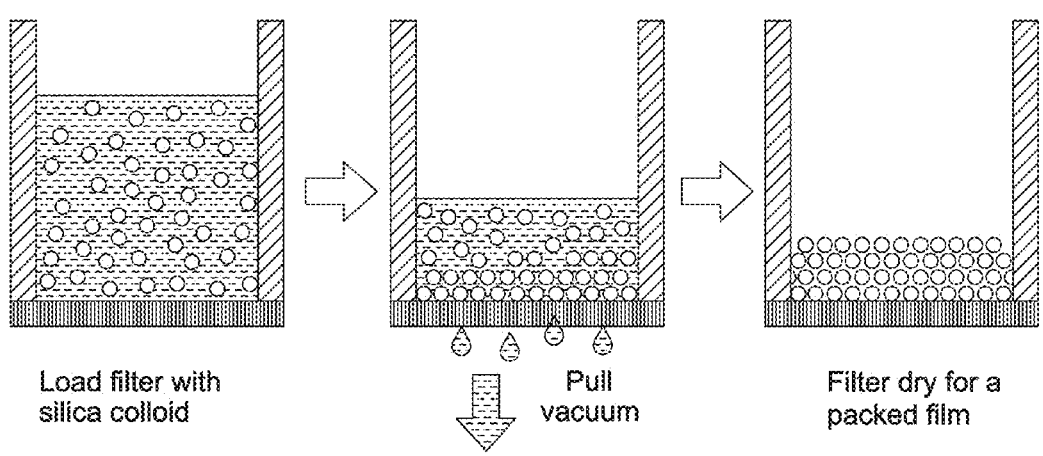
FIG. 4 shows an example of a process of compaction using a filtration method in accordance with one aspect of the disclosure.

FIG. 4 shows an example of a process of compaction using a filtration method in accordance with one aspect of the disclosure. Initially, ½ to ¾ of the total colloid volume is added for filtration. After the initial filtration is ~90% complete, the remaining colloid is added. By breaking the colloid addition into multiple steps, the cracks formed during the process are minimized. The filtration step is volume limited as larger amounts of colloid cannot be filtered due to nanoparticles preventing solvent flow. In FIG. 4, colloid is vacuum filtered to produce an ordered, packed film.

After filtration, tiny cracks form in the deposited film. An example of these cracks is shown in FIG. 5. Cracks form in the film as the colloid dries due to dehydration of the nanoparticles. These cracks are an artifact from the nanoparticle shrinking as the hydration shell is removed upon drying. The cracks have proven to be integral to keeping a well-ordered crystal structure during the polymerization process. When the pre-polymer solution is add to the thin film of nanoparticles, the particles hydrate and expand, filling most of the empty volume where the cracks formed. The cracks can be eliminated by timing colloid additions as the film begins to dry. The additional colloid fills the crevices, and a more ordered crystal is formed. However, it was found that a uniform crystal cannot tolerate the expansion stresses from hydration as the prepolymer solution is added. The ordered crystal fractures without some cracks in the film to mitigate the volume expansion stresses. Filtration methods that follow the two step addition procedure appear to work well in creating a structure that has minimal cracks and offers good stability in regards to the volume change induced by nanoparticle hydration resulting from monomer solution addition. In one aspect, a main drawback of this approach is, however, that the specimen surface is completely covered with polymer preventing access to the silica nanoparticles rendering their complete removal via HF dissolution difficult.

(3) Compaction Via Centrifugation

In one aspect of the disclosure, an alternative method to forming a compacted nanoparticle crystal or film is to use an ultra centrifuge to pack the nanoparticles into a pellet that is, for example, approximately one inch in diameter and one quarter to three eighths of an inch deep. In one aspect, the centrifuge method has benefits of faster processing speed and an increased material volume per sample and is a good approach (fastest and readily scalable). In one aspect, a drawback is that with the increased volume comes an accessibility issue for the HF to etch the silica nanoparticles as well as the titania precursor to be inserted into all pores. In one aspect, this is overcome by breaking the pellet into smaller pieces to expose large fracture surfaces. Significant improvements have been made in the HF process and the current method of serial HF etching steps removes most of the silica nanoparticles. Further improvements may remove all silica nanoparticles to produce pure nanoballoon batches.

According to one aspect of the disclosure, the compaction takes place in the same centrifuge tubes as are used for colloid purification. After the colloid is purified, a final colloid centrifugation step takes place with a 4× concentration of colloid. The centrifuge is set to operate at 8500 RPM for two hours, under refrigerated conditions. Centrifuge duration of two hours is long enough to provide a relatively stable pellet at the bottom of the round-bottom tubes. The supernatant is then decanted off, leaving the pellet remaining. A spoon-like spatula is then inserted into the tube, and the pellet is gently removed from the tube; care needs to be exercised to ensure the pellet is not damaged too much during removal. The pellet is then placed on an aluminum weighing boat, top-side down. The aluminum boat works well because: 1) it has a flat surface to place the pellet down; 2) it is small enough to hold the volume of monomer solution; 3) it is chemically resistant to the monomer solution; and 4) it is thermally tolerant to the temperatures required for polymerization. When placing the pellet onto the boat, gentle pressure is applied to flatten the pellet surface to the bottom of the boat. Gentle pressure is required because the top of the pellet is gelatinous, and some of the silica gel will displace to the outer edge of the pellet.

Step A2: Create Porous Template

Step A2-102: Polymerization

According to one aspect of the disclosure, the choice of polymer to be used as a polymer template depends on the desired end product. For hollow nanostructures, the desired shell material needs to have an affinity for the polymer. For synthesis of novel solid nanoparticles, the polymer used needs to repel the final product and its precursor compounds.

One method of creating nanoballoons focused on the formation of hollow titania ($TiO_2$) nanoballoons. To achieve that, a polystyrene polymer was chosen for the template according to one example. Since the titania precursor, tetraalkoxy titanium, has a high affinity for polystyrene, it adheres well to the polymer template pore walls once the silica has been removed. If, on the other hand, polyurethane was used as the polymer of choice, the repulsive interaction between the polymer and titania precursor would lead to titania nanoparticles contained within the pores of the polymer template instead of hollow nanoparticles. The degree the pre-polymer or monomer solution infiltrates the silica pellet depends on the viscosity and polymerization rate. Silica is removed from the polymer template based upon the silica nanoparticle contact points. These contact points form interconnected pores as the silica is etched. The size of these pores is dependent on polymerization conditions.

Two initiators were investigated, AIBN (azobisisobutyronitrile) and benzoyl peroxide. Both of these initiators are thermally activated, meaning heating the solution initiates polymerization. These are free radical polymerizations, so care needs to be taken to properly set up the reaction. Initiators are often times photo-active, in which case the polymerization is initiated with UV exposure. The polymerization temperature affects both the viscosity and the polymerization rate, with some variability due to the polymerization initiator. A 2% and 4% benzoyl peroxide solution in styrene was used for polymerization.

(1) Filtration Approach

In one aspect of the disclosure, to polymerize the samples obtained from the filtration deposition, the silica film was not disturbed after the filtration was completed. The prepolymer solution is placed directly into the filter apparatus. The nanoparticle filter bed prevents the solution from draining through the glass frit quickly. The polymer solution is filled to 1 cm above the level of the silica nanoparticles, to allow for evaporation and leakage through the filter. The vacuum apparatus is placed in a metal container to catch any polymer solution that goes through the filter. The entire filtration apparatus is then placed into the vacuum oven at 60° C. The atmosphere in the oven is replaced with nitrogen by a purge/fill process. The polymerization is then allowed to run overnight in the nitrogen-filled vacuum oven.

FIG. 6A shows an example of silica nanoparticles encased in the polymer fabricated in the filtration assembly. FIG. 6B shows an example of a section of a polymerized pellet once it has been removed from the filter setup. Everything binds together during the polymerization process, so care needs to be exercised when separating pieces. Addition of acetone to the joints helps to break down the polymer and aids significantly for separation of the top and bottom portions of the filter assembly. Removal of the polymer from the filter itself requires the use of a razor blade; a very minimal amount of acetone can be useful to separate the filter from the polymer film. The filter assembly is cleaned by immersion in toluene with intermittent sonication steps to hasten the polymer dissolution process.

(2) Centrifugation Approach

In one aspect of the disclosure, a preferred scalable approach was found to be nanoparticle compaction by centrifugation of the silica nanoparticles as discussed earlier. The obtained pellet is removed from the centrifuge tube using a spatula with a spoon-like tip. By carefully sliding the spatula under the pellet, it can be dislodged from the tube, and transferred to the container for polymerization. Aluminum weigh boats have provided the best success as a container for the polymerization step. These boats are small enough that they can have a watch glass or Petri dish over them to reduce evaporation during the polymerization process, and large enough to hold the pellet with room for excess monomer/pre-polymer solution. The aluminum boat is also chemically resistant to the pre-polymer solutions. Once contained within the aluminum boat, the pellet is transferred to the vacuum oven at 60° C., where it is dried by pulling vacuum for a period of 1-2 hrs. Removing the solvent from the pellet improves the polymerization process, as residual solvent seems to suppress the polymer formation, leading to a rubbery polymer pellet. The styrene solution (or other pre-polymer solution) is added to the aluminum boat, in a drop-wise fashion to ensure the fragile pellet is not disturbed. The boat is covered to reduce evaporation, and polymerized in a nitrogen atmosphere overnight.

Step A2-103 & 104: Silica Nanoparticle Removal via HF Etching

In one aspect of the disclosure, hydrofluoric acid (HF) is used to remove the silica nanoparticles from the nanoparticle-polymer composite, leaving a polymer template of interconnected pores. FIG. 7A is an example of an SEM image of a porous polystyrene material after the silica nanoparticles have been removed by etching. Nanometer pores are formed by removing the silica nanoparticles, leaving behind the polymer structure. HF is a common etchant to remove glass, but because HF is an extremely strong acid, care needs to be exercised when handling HF. The composite materials are immersed in a 4% HF aqueous solution. The HF etching occurs in a fume hood, in Nalgene plastic bottles within secondary containment. Initial etching experiments used 2% HF, but the lower concentration of acid meant more solution was required to etch the silica nanoparticles. The removal of silica follows two reactions, which convert the $SiO_2$ to $SiF_4$ and $H_2SiF_6$ according to:

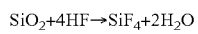

$$SiO_2 + 4HF \rightarrow SiF_4 + 2H_2O$$

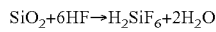

$$SiO_2 + 6HF \rightarrow H_2SiF_6 + 2H_2O$$

depending on the local HF concentration. These competing reactions account for the dissolution of silica from the polymer template. The required amount of HF acid to remove the silica was calculated based upon a combination of the two reactions. Once the silica has been removed to form the polymer template, the polymer is triple washed with water followed by isopropyl alcohol to ensure there is no residual HF within the porous structure. To remove any volatile residues, the material is heated in vacuum for 2-3 hrs at reduced pressure.

Figure 8:
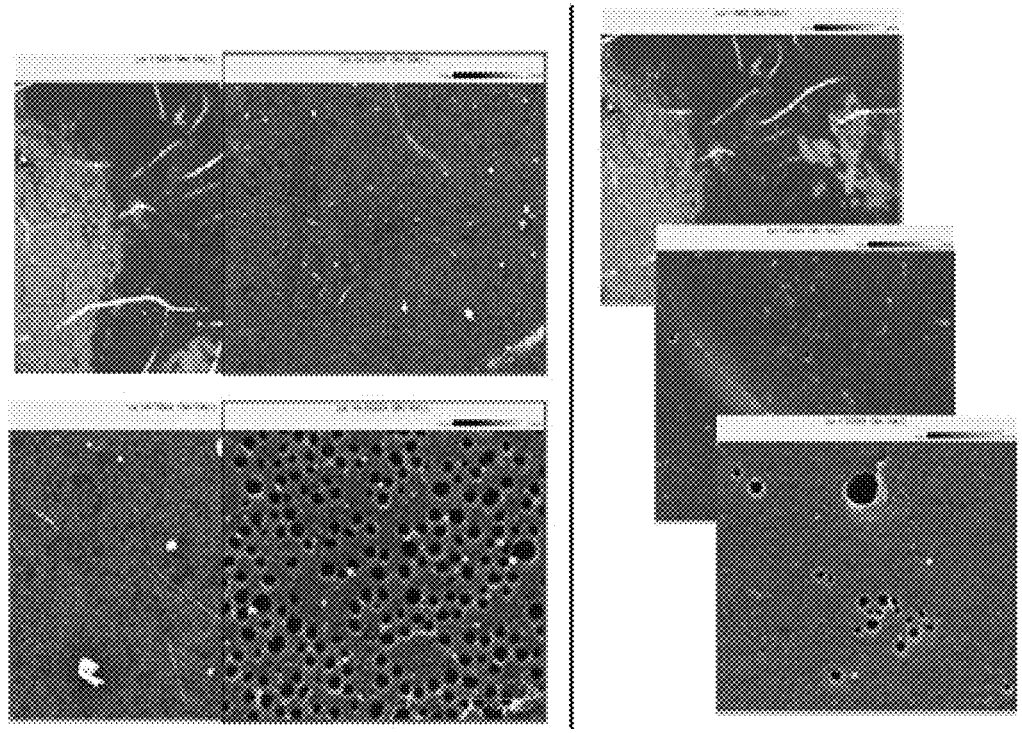
FIG. 8 shows a thin film of polymer formed in the interface between the filter and nanoparticle layers in accordance with one aspect of the disclosure.

According to one aspect of the disclosure, composite materials made from the filtration and the centrifugation methods are both etched in a similar fashion to remove the silica nanoparticles. It was discovered that a thin film of polymer is formed in the interface between the filter and the nanoparticle layers. An example of this thin layer is shown in FIG. 8, and was found to limit the HF access to the interconnected pores, thus reducing the efficiency of the etching process. A polymer film surrounding the composite structure limits HF access and reduces etching ability.

According to one aspect of the disclosure, two methods were used for removing this polymer film. An oxygen plasma etch process using 85% oxygen and 15% $CF_4$ worked well to remove the thin polymer film without significantly damaging the underlying nanoparticle-polymer composite below. For most films it was found that five minute plasma etch processing was sufficient to remove a significant portion of the polymer film. The polymer film was also successfully removed by swabbing with either acetone or toluene. Acetone was found to work more effectively as it dissolved the polymer quickly and readily evaporates. In one aspect, it is important that a very small amount of acetone is used for this process in order to prevent the acetone from infiltrating the composite and degrading the polymer. The polymer composite film fabricated from the centrifugation process was encased in polymer on all sides. The bottom of the pellet composite was relatively flat and the polymer coating was generally removed with acetone. The curved surface of the pellet does not etch evenly with the plasma process. Areas along the top of the pellet were swabbed with acetone to increase HF access to the silica nanoparticles. In one aspect, a preferred approach to provide good access to the silica nanoparticles was to break the pellets into smaller pieces. The generated fracture surfaces allowed excellent access and silica dissolution.

According to one aspect of the disclosure, the composite structure was fractured in both methods prior to being placed in the HF bath for etching. By fracturing the composite, an entire surface can reliably have the silica removed. SEM analysis of a freshly cleaved surface determined that the HF was unable to access the entire silica network with, although access is significantly improved.

Figure 9:
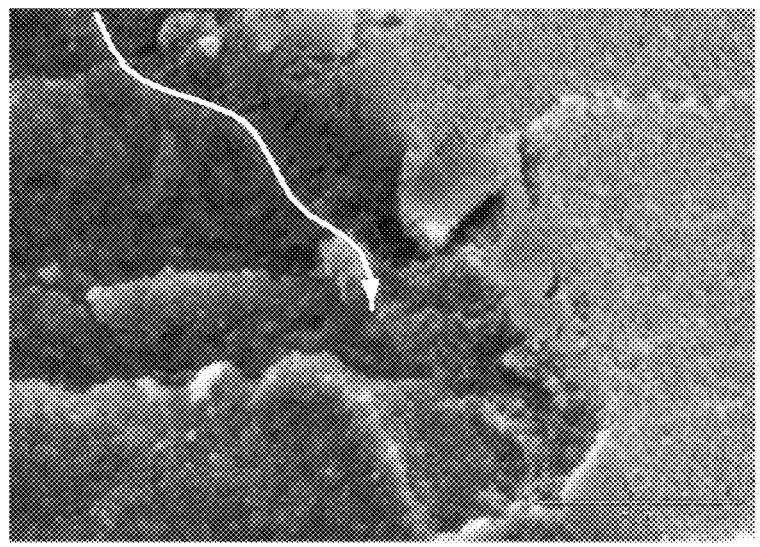
FIG. 9 depicts an example of an SEM image that shows the HF penetration into the nanoparticle/polymer composite in accordance with one aspect of the disclosure.

FIG. 9 depicts an example of an SEM image that shows the HF penetration into the nanoparticle/polymer composite. High magnification imagery and complimentary EDS analysis confirmed the boundary areas where HF was able to penetrate the composite material and etch the silica nanoparticles. In the instance of the sample shown in FIG. 9, silica nanoparticles were etched to a depth of a few mm from a centrifuged pellet with a thickness of approximately one cm. FIG. 9 shows an example of a boundary of silicon removal through HF access. The curved line arrow highlights dividing line of porous structure (right) and composite materials (left).

Further improvement in the HF etching process can achieve removal of the silica nanoparticles to form the porous polymer template. The increased number of nanoparticles requires additional HF for etching, and the transport through the nanometer-sized pores slows down the diffusion process.

According to one aspect of the disclosure, calculations were made to determine the required quantities necessary to remove the silica, and pellets were fractured to provide shorter transport distances in effort to improve the etching efficiency.

Figure 10:
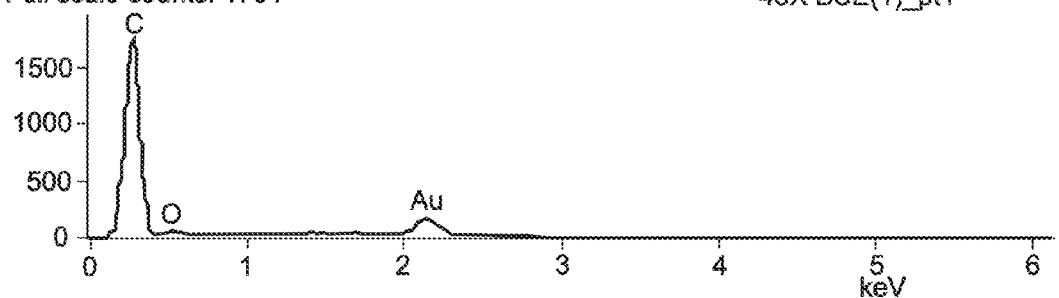
FIG. 10 shows an example of EDS points taken along a cleaved surface at various depths from the HF exposure face in accordance with one aspect of the disclosure.
Figure 10:
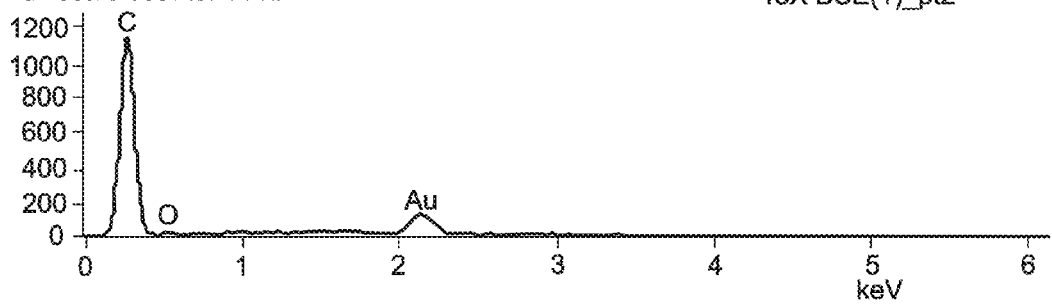
Figure 10:
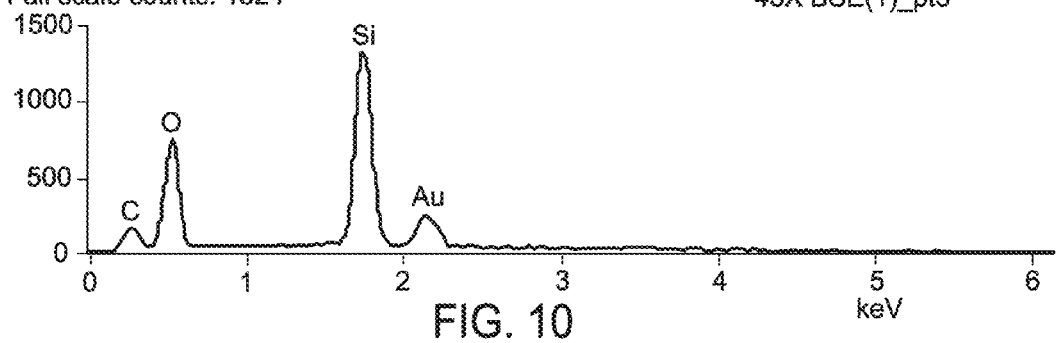

FIG. 10 shows an example of EDS points taken along the cleaved surface at various depths from the HF exposure face. An EDS analysis is a useful tool in determining the depth of silica etch. The EDS technique is useful for providing information of the composition at a certain point on the surface and area immediately below. The penetration depth of EDS can be increased by increasing the acceleration voltage of the SEM, which can be useful for determining if silica nanoparticles are present in the underlying area just below the surface being investigated. To improve etching performance, samples were left in HF solution for longer periods of time (4 hrs, 8 hrs, and overnight), and the HF solution was replaced at these intervals. Sufficient HF was used to etch an excess of 20% silica, to ensure that enough HF was present. The composite materials were frequently agitated while immersed in HF to help displace consumed etchant. The prolonged exposure is required due to the extremely small pore size. With pores of a one hundred nanometers in diameter after silica removal and holes only a few nanometers in diameter at the pore-interconnects, solvent mobility is severely limited.

Figure 11:
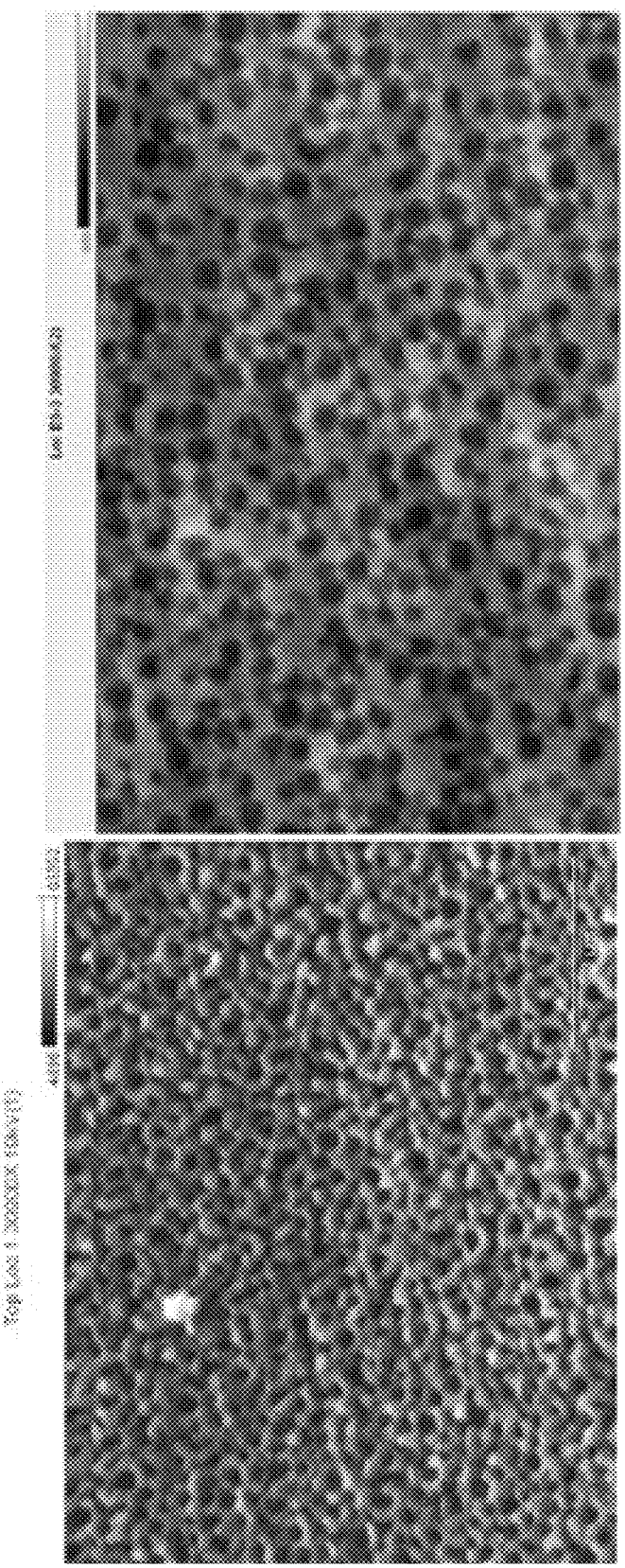
FIG. 11 is an example of SEM images of a porous polymer template in accordance with one aspect of the disclosure.

FIG. 11 is an example of a high magnification SEM image of an area of the porous polymer template that has had the silica nanoparticles etched away by HF acid. The pores are interconnected as a consequence of the points where the silica nanoparticles were in contact with one another. These interconnect points allow the HF to access the inner volume, and will also provide a route for the nanoballoon precursor material to infiltrate the porous structure.

Step A3: Nanoballoon Formation

Step A3-101: Nanoballoon Precursor Formation

According to one aspect of the disclosure, initial nanoballoon synthesis was designed to make hollow nanoparticles of titania. Titania is made by using a titanium alkoxide precursor, which quickly decomposes upon exposure to air unlike the equivalent silica precursor, which requires harsher conditions i.e. water. The titanium precursor solution is made by preparing a 1 M solution of titanium tetraethoxide in ethanol. The precursor concentration is one of the variables that can be used to tailor the shell thickness for the hollow nanostructures.

Step A3-102: Filling Voids in Template

The porous polymer template is filled with precursor solution, and a titania coating forms on the polymer walls as the solution dries. Multiple titania coatings are performed to increase the shell thickness. The porous polymer is dipped into the titania precursor solution, then removed and allowed to air dry for up to 30 minutes. The polymer is then dipped again, and the number of subsequent titania coating steps was varied from three to ten to investigate the effect of multiple coatings on shell thickness.

Step A3-103: Nanoballoon Isolation/Polymer Removal

According to one aspect of the disclosure, once the titania coating process is complete, the polymer is removed, releasing the hollow nanoballoons. The polymer can be removed through chemical or thermal processing. Chemical etching of the polymer was done by using an 3:10 ethanol:chloroform mixture. The titania/polymer composite is immersed in the chemical etching solution overnight to allow the solution to completely remove the polymer. The solution is then centrifuged to collect the nanoballoons and washed with ethanol. The collected nanoballoons are then resuspended in ethanol.

Figure 12:
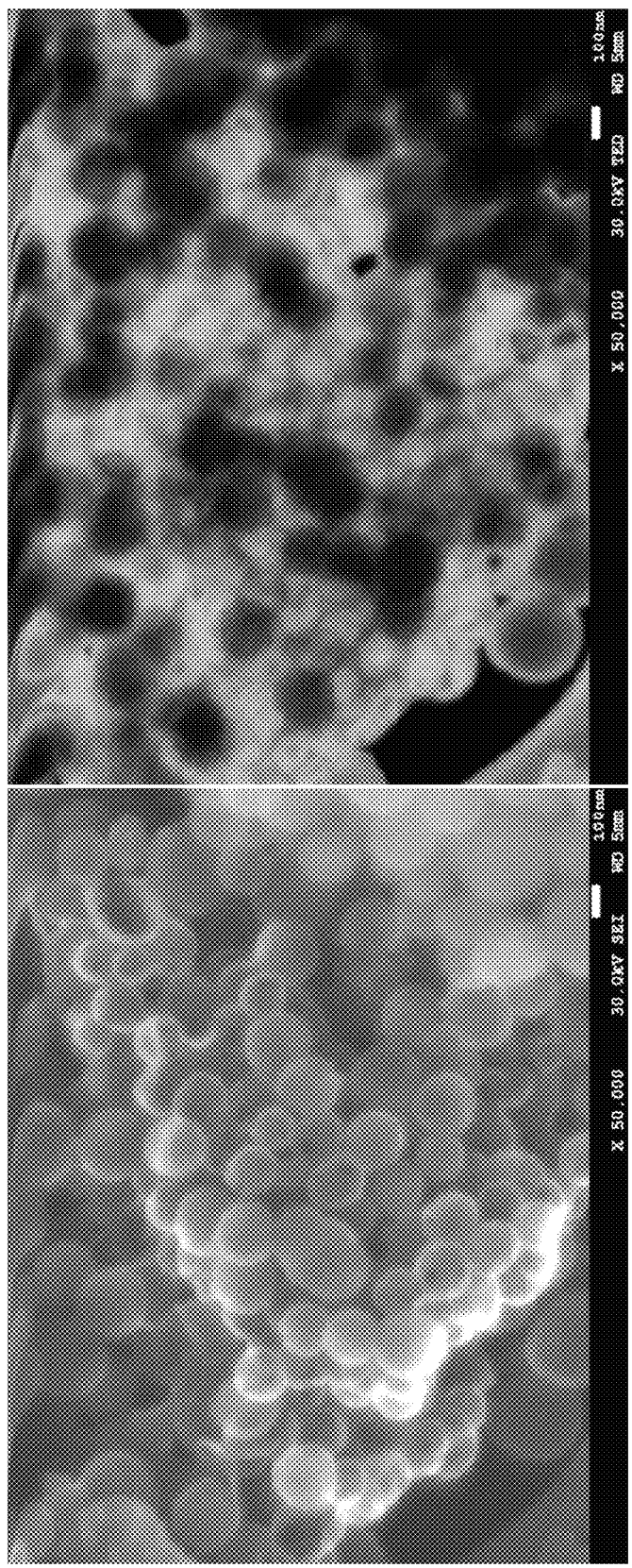
FIG. 12 shows an example of an SEM image (left) and a TEM image (right) of nanoballoons in accordance with one aspect of the disclosure.

FIG. 12 shows an example of nanoballoons that were drop-cast onto a TEM grid and analyzed with the SEM. The image on the left is an SEM image of titania nanoballoons with some silica nanoparticle impurities. The TEM image on the right shows the nanostructures are indeed hollow. There are residual silica nanoparticles present from an incomplete etch process, which can be identified in the SEM image and are the nontransparent spheres in the TEM image. The images cover the same area, so there is direct correlation between the image on the left and the one on the right. The shells of the nanoballoons can be seen in the dark field image on the right. Alternatively, the polymer encasing the titania nanoballoons can be removed by calcining the material, which removes the polymer but does not affect the nanoballoons. The composite material is placed in a furnace at 450° C. for 4 hrs. The product is then collected and resuspended in ethanol, and can be purified by centrifugation processes similar to those performed with the silica nanoparticle purification.

Figure 13:
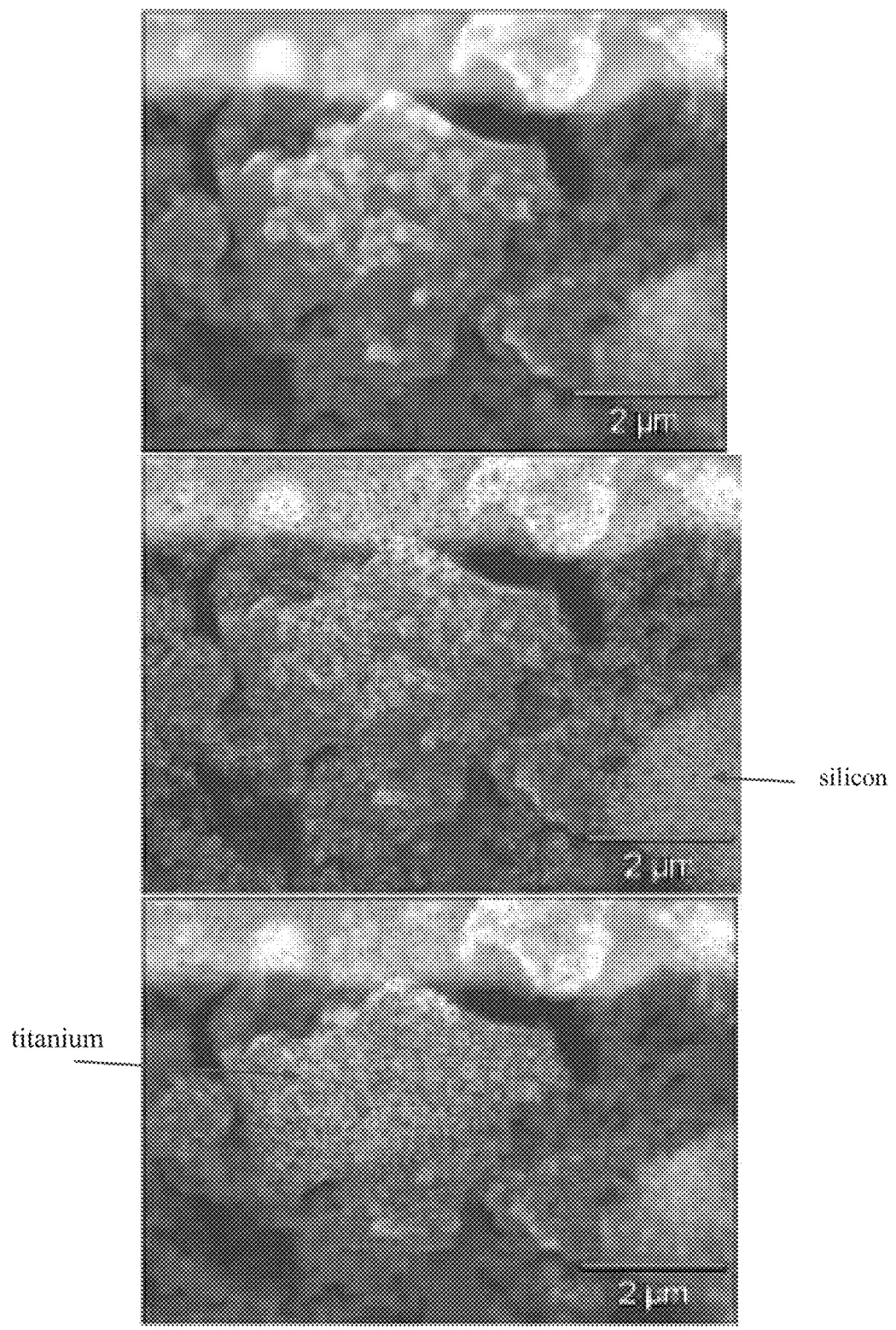
FIG. 13 shows an example of EDS mapping that differentiates the titanium rich areas (as highlighted in the bottom image) from the silicon rich areas (as highlighted in the middle image) in accordance with one aspect of the disclosure.

To observe the titania content from a more microscopic point of view, EDS mapping is performed to show the presence of various elements within a sample. FIG. 13 shows an example of EDS mapping across a sample with a titania impurity, silica nanoparticles, and titania nanoballoons. The top image is the SEM image used for mapping. The shaded points in the middle image correspond to silicon presence and arise from the silica nanoparticles within the sample. The shaded points on the bottom image of FIG. 13 are titanium rich areas. There are two different sources for the titanium in this sample, the first is a large piece of titania that was on the outer surface of the polymer template, and the second are patches of titania nanoballoons. The smaller patches were investigated at higher magnification to confirm nanoballoons were contained in these regions.

Alternative Methods

Figure 14:
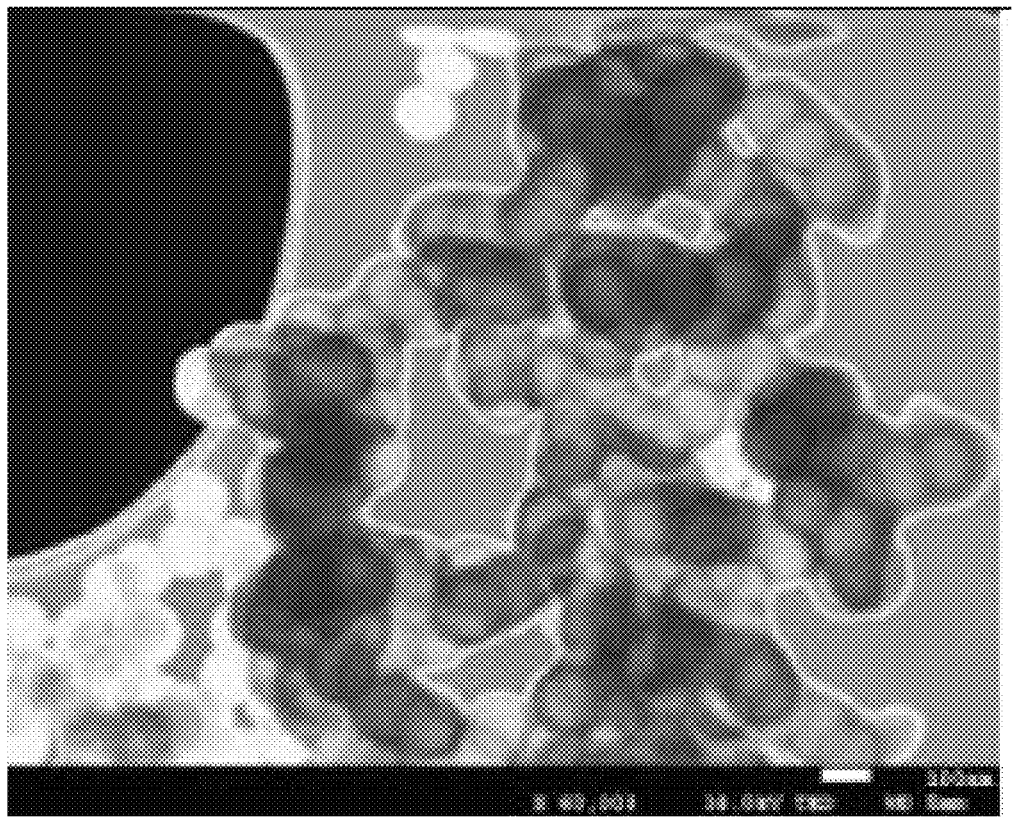
FIG. 14 shows an example of titania coated polystyrene beads as fabricated and drop-cast from solution in accordance with one aspect of the disclosure.

According to one aspect of the disclosure, coating of polymer beads can be used as an alternative nanoballoon synthesis method. With this method, polymer beads are coated with a ceramic, metallic, or other type of coating, followed by calcining the sample to remove the inner polymer core. FIG. 14 shows an example of titania coated polystyrene beads as fabricated and drop-cast from solution. Care needs to be taken to avoid agglomeration of the Titania coated polymer beads leading to very non-uniform and incomplete coating. The other challenge is to remove the core bead without destroying the shell. Solvent based removal requires holes in the shell for effective access and dissolution of the core material. Polymer beads are commercially available in a wide size range from 50 nm to several microns in diameter with a narrow size distribution. They come with different surface chemistries in form of different molecular groups attached to their surface. Tests were performed with three different types of 100 nm size beads, uncoated, with carboxyl surface groups and amine surface groups. The surface chemistry plays a key role in attaching the compound or precursor used to form the shell material.

Figure 15:
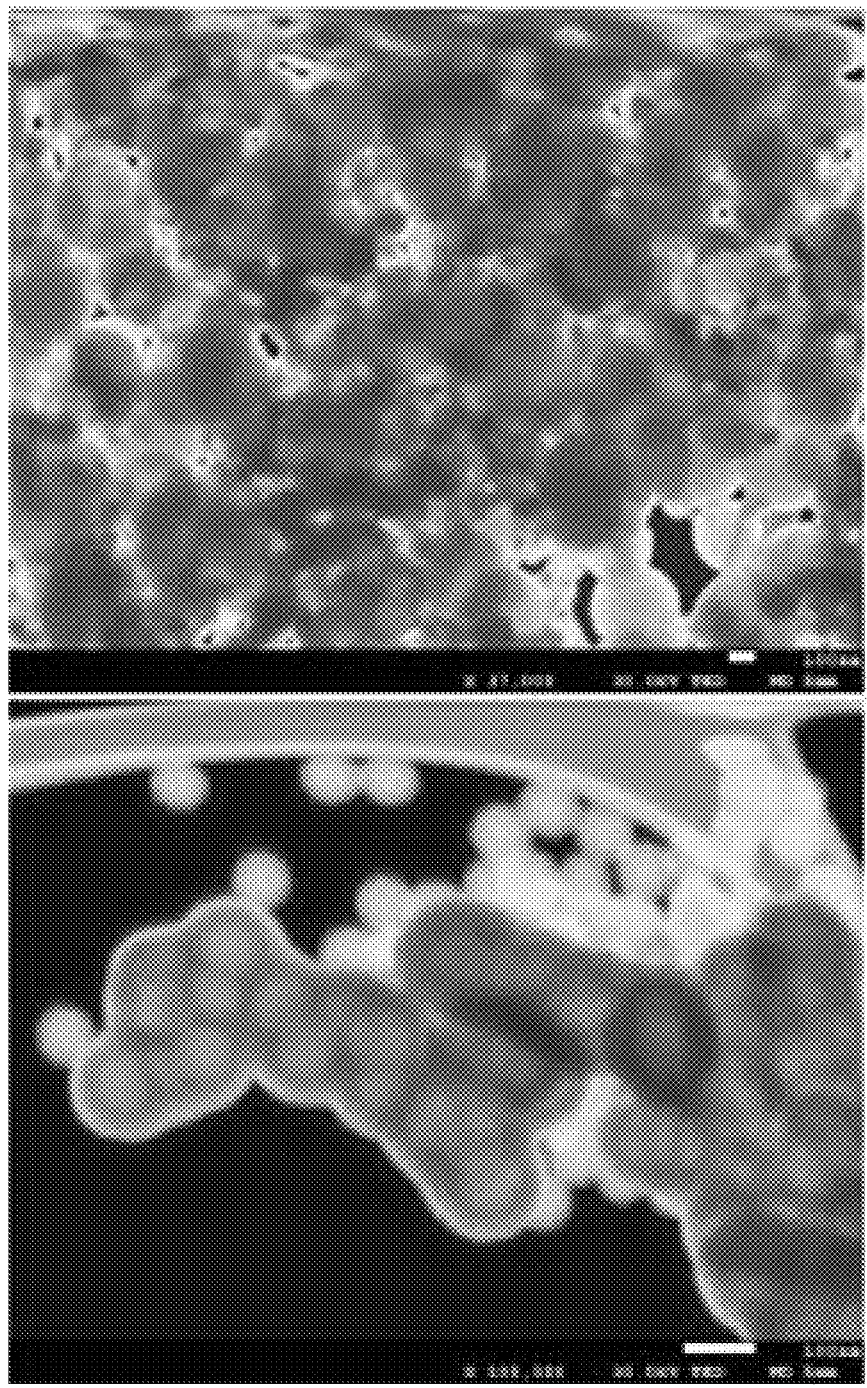
FIG. 15 shows different polymer bead coatings in accordance with one aspect of the disclosure.

FIG. 15 shows how the different polymer bead coatings affect the ability for the titania precursor material to attach to the beads in accordance with one aspect of the disclosure. The top image was taken from amine-coated beads and the bottom image was from plain polystyrene beads. The amine coated beads appeared to have repelled the titania precursor and did not get coated. The plain beads as well as the carboxylic coated beads have been coated. Nanoballoons of alternative materials may require different attachment chemistry, which is readily achieved by changing the surface chemistry of the polymer beads. To achieve uniform coating, vigorous agitation as found in fluidized bed gas phase processes is required and the precursor concentration as well as particle concentration need to be chosen correctly for the reaction conditions especially reaction volume and changes with change in volume. In one aspect, a most effective agitation method is passing an inert gas through the reaction medium to induce chaotic mixing rather than simple stirring, which produces a regular vortex and laminar flow patterns.

Nanoballoon Synthesis According to Another Aspect of the Disclosure

According to one aspect of the disclosure, a carbide such as TaC is selected for nanoballoon synthesis because it is one of the most refractive materials known with a melting point (m.p.) of about 3880° C., making it a prime materials candidate to address very high temperature insulation problems such as the those encountered by reentry conditions. Typically, refractory carbides need to be made at temperatures close to 2000° C. This is due to the fact that carbon in form of graphite and hydrocarbon compounds contain strong covalent bonds that need to be broken requiring a very high activation energy. General preparation methods of carbides are direct combination of the elements above 2000° C., reaction of metal oxides with carbon at very high temperatures, or reaction of heated metals with gaseous hydrocarbons. Most carbides contain lattices with very strong covalent bonds leading to very high stability, hence, the "refractoriness" of metal carbides. Such approaches to make nanoballoons would not allow any control over particle size and size distribution and the creation of nanoballoons.

According to one aspect of the disclosure, carbide nanoballoons (i.e., carbide nanoballoon precursors) may be fabricated using a low temperature approach taking advantage of the low stability of organometallic compounds of the general structure MRx, with M being a transition metal and R being an organic ligand such as but not limited to methyl ($—CH_3$, $—C_2H_5$, etc). For example, $TaMe_5$ is only stable at temperature around −50° C. and upon warming decomposes. In one aspect, this approach may include the following procedures:

Step A3-101: Fabricate organometallic nanoballoon precursors
Step A3-101a: Fabricate metal (e.g., Ta) nanoparticles/nanoballoons by "thermal" decomposition.
Step A3-101b: Convert metal (e.g., Ta) nanoparticles/nanoballoons to a carbide (e.g., TaC) at low temperature Steps A3-101a and A3-101b described above can be combined with Steps A1. A2, A3-102, and A3-103 to produce nanoballoons, and Steps A1, A2 and A3 can be followed by Steps B1 and B2 to convert the carbide nanoballoons made from Steps A1, A2 and A3 into a coherent foam coating. Steps B1 and B2 include, for example, the following: Step B1: Formulate nanoballoon (e.g., TaC) solvent mixture; and Step B2: Consolidate nanoballoons (e.g., TaC).

Examples for Step A3-101 (including Steps A3-101a and A3-101b) are illustrated below according to one aspect of the disclosure.

Step A3-101a: Fabricate Metal (e.g., Ta) Nanoparticles

The formation of Ta metal nanoparticles has not been attempted before in solution, either by a reduction route or thermal decomposition. Ta is not a noble metal like Au, Ag, Re, Ir and the like. Therefore, it is not easily reduced to the metal state. Normally, it requires hydrogen reduction at elevated temperature or even elemental sodium to reduce either the oxide ($Ta_2O_5$), which is one of the most stable oxides known, or the chloride ($TaCl_5$), the most common Ta precursor used. Both reactions are not practical for controlled nanoparticle synthesis.

In one aspect, since $TaCl_5$ is moisture sensitive, great care needs to be taken to remove all moisture and oxygen from the solvents and the glassware that is being used. This is because Ta prefers to form the oxide rather than go to the metal state. However, once the metal nanoparticles are formed and protected with a suitable surfactant, they are stable and can be handled in air and be exposed to water.

According to one aspect of the disclosure, the following provides various approaches to creating the metal nanoparticles:

(1) Reduction of $TaCl_5$ Using Na-Naphthalene in T3G

This sodium reagent is a powerful reducing agent, is highly reactive, i.e., moisture and oxygen sensitive, and therefore needs to be made fresh every time and used quickly, since it has a very short shelf life. Still, this reagent is made easily and quickly by simply reacting sodium with naphthalene in T3G. However, it poses the challenge on how to separate the non-polar nanoparticles from the equally hydrophobic naphthalene electron mediator present in the reaction mixture.

Figure 16:
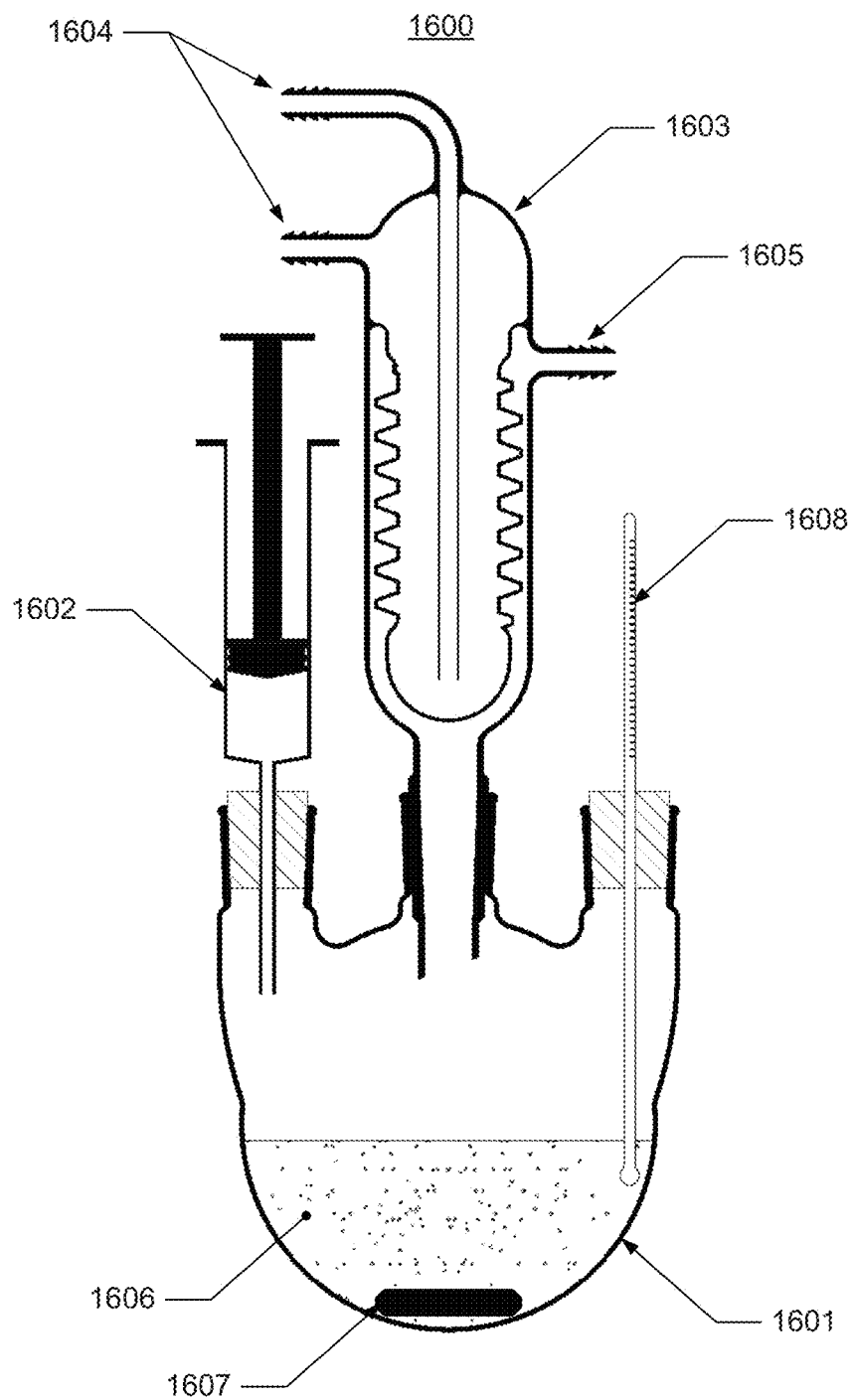
FIG. 16 illustrates a reactor used in the manufacture of tantalum (Ta) nanoparticles in accordance with one aspect of the disclosure.

FIG. 16 illustrates a reactor used in the manufacture of tantalum (Ta) nanoparticles in accordance with one aspect of the disclosure. Reactor system 1600 includes a continuous stirred-tank reactor 1601, into which reagents 1606 are provided via a syringe or an addition funnel 1602. An impeller 1607 stirs the reagents 1606 to ensure thorough mixing thereof (e.g., to optimize the particle size distribution of the tantalum nanoparticles). A condenser 1603 allows gases created in the chemical reactions occurring in reactor 1601 (e.g., hydrogen and diborane in the present exemplary embodiment) to escape through outlet 1605, while coolant which flows through ports 1604 through condenser 1603 cools more volatile species (such as the surfactant or the solvent) and allows them to trickle back down along the corkscrew-shaped path in condenser 1603 into reactor 1601. A thermometer 1608 is used to track the temperature of the reagents 1606 during the chemical reaction. System 1600 may further include a heat source (not illustrated) to increase the temperature of the reaction, and thereby control the size and size distribution of the rhenium nanoparticles, as described in greater detail below.

According to one aspect of the disclosure, reactor 1601 can be heated (or cooled) to control the temperature at which the reactions therein take place. The duration for which heat is applied provides a mechanism for ensuring even distribution of the reagents during the reaction and thorough mixing thereof, so that the size distribution of the tantalum nanoparticles can be narrowed. For example, in accordance with one aspect of the present invention, reactor 1601 is cooled to near 0° C. to dissolve the sodium aided by naphthalene in THF, glyme, or ethylene diamine, because the formed sodium-naphthalene-solvent complex does not form at higher temperatures. Then it is transferred to a similar apparatus containing a solution of the tantalum precursor and surfactant via syringe or cannula to ensure an even distribution thereof. Subsequently, the cooling is removed to complete the reduction of tantalum chloride.

According to another aspect of the disclosure, the concentration of surfactant in the reaction can similarly modify the resultant size and size distribution of tantalum nanoparticles. With higher concentrations of surfactant, the tantalum nanoparticles are more likely to encounter and bond with surfactant molecules early in their growth, resulting in both smaller nanoparticles, and a smaller distribution of particle sizes.

The above approach can be carried out using either sodium, lithium, or potassium in solvents such as THF, glyme, or ethylene diamine (ED). However, in one aspect, sodium is a preferred choice, because it is the most soluble of the three. The advantage of ED is that it is as a bidentate ligand a surfactant in itself that helps control reaction speed and with that particle size and size distribution by coordinating to the surface of the formed nanoparticles slowing down growth.

(2) Reduction Using Tri-Ethyl-Aluminum, $Al(C_2H_5)_3$ (TEA)

Tantalum oxide is dissolved in a basic (>pH 10) aqueous solution and precipitated out in nanoform by adding sodium chloride forming $NaTaO_3$. After careful drying, the latter is reduced using TEA at elevated temperatures. The driving force is the formation of aluminum oxide, which exhibits a very high energy of formation. TEA decomposes at elevated temperatures starting above 250° C. in solution forming highly reactive aluminum powder. The formation of nanoparticles is controlled via the presence of suitable surfactants.

(3) Thermal Decomposition of Penta-Alkyl-Tantalum, $TaR_5$

Organometallic compounds like the penta methyl, penta ethyl and the like are unstable at room temperature and have to be made at temperature as low as −50° C. Upon moderate temperature increase still below 0° C., such compounds decompose forming tantalum metal, hydrogen and the respective alkene. Compounds with an β-hydrogen atom are most suited due to the well known β-elimination mechanism. The reaction is conducted in THF using $TaCl_5$ and adding the respective Li-organic precursor to form the organometallic tantalum compound:

$$TaCl_5 + 5LiR \rightarrow 5LiCl + TaR_5 \qquad 1.$$

Step A3-101b: Convert Ta Nonoparticles to TaC at Low Temperature

In one aspect of the disclosure, due to the high reactivity of metal (Ta) nanoparticles, low temperatures may be utilized to convert Ta to TaC. Well known is the pyrophoric behavior of unprotected metal nanoparticles in air. They spontaneously combust when exposed to oxygen or water.

According to one aspect of the disclosure, metal nanoparticles (e.g., Ta) can be converted into carbide nanoparticles (e.g., TaC) using suitable long chain surfactants with relative low volatility and appropriate reaction conditions (e.g., annealing at temperatures as low as 560° C. for 5-20 min).

Nanoballoon Synthesis According to Another Aspect of the Disclosure

According to one aspect of the disclosure, a metal (e.g., Ti, Ta) nanoballoon precursor formation is described below. This is an example of Step A3-101.

a. One implementation is first the infiltration of the polymer nanoballoon template (styrene based) with a solution containing a suitable metal precursor such as the chloride or bromide (e.g., $TiCl_4$, $TaCl_5$) which subsequently is dipped in a solution containing a suitable reducing agent.

b. In one aspect, the precursor solution can be made of THF or a glyme family solvent (Glycol Diethers) with mono-glyme (ethylene glycol dimethyl ether), di-glyme (diethylene glycol dimethyl ether) or tri-glyme (triethylene glycol dimethyl ether) being preferred. This solvent family dissolves many materials very well. The metal halide is dissolved with the aid of an organic amine such as aliphatic amines ($C_4$—butyl amine to $C_{16}$—hexdecyl amine). In one aspect, preferred materials are $C_4/C_6/C_9/C_{12}$ as well as ethylene-diamine ($NH_2$—$C_2H_4$—$NH_2$) and diethylene-triamine ($NH_2$—$C_2H_4$—$NH$—$C_2H_4$—$NH_2$), pyridine, aniline. The reaction is somewhat exothermic and vigorous stirring is required. Usually, the salt is weighed out in a dry box and the dry solvents are added outside (schlenk technique) via syringe/cannula or additional funnel; all carried out under inert gas atmosphere. In one aspect, a preferred gas is argon or dry nitrogen.

c. In one aspect, the reducing agent consists of lithium, sodium or potassium dissolved in THF or mono-glyme. In one aspect, ethylene-diamine can be used as a solvent but not as good as the other two with mono-glyme being the preferred choice. The solution is only stable near 0° C. and needs to be cooled; if too warm, the metal will precipitate and does not infiltrate into the pores of the polymer template. After initial infiltration, the cooling mixture is removed to accelerate the reaction.

d. In one aspect, hydrazine can be used as well as the reducing agent.

e. In situ thermal decomposition of organometallic precursors: In one aspect, a preferred method is to use organometallic precursors such as $Ti(R)_4/Ta(R)_5$ with preferably ethyl or butyl, isopropyl, isobutyl. These compounds are unstable and can in most cases not be isolated, which in this case is not necessary. They often decompose already below 0° C. In one aspect, they need to be made below −50° C. The presence of amines which are mentioned above increases their stability by forming amine complexes such as $Ti(C_2H_5)_4*2$ pyridine or $Ta(C_2H_5)_5*$pyridine. However, they still decompose below 0° C. They are made in the presence of a suitable amine at low temperature using the respective Li organyl ($LiC_2H_5$, etc). The above solvents (THF and glyme) are suitable, but need to be dry. According to one aspect of the disclosure, once the precursor has been made and the polymer template infiltrated, the temperature is slowly raised to ambient temperature upon which the precursors decompose depositing the metal onto the pore walls forming the nanoballoon shell.

f. According to one aspect of the disclosure, when using long chain surfactants (e.g., $C_{12}$ amine and longer), the metal nanoballoons can be turned into the respective carbide nanoballoons upon suitable heat treatment (600-900° C.) for 30-90 min.

g. According to one aspect of the disclosure, the polymer template is removed using dry toluene, chloroform or acetone to isolate the nanoballoons prior to calcination.

h. According to one aspect of the disclosure, the foregoing approach is suitable for all metals of interest.

Nanoballoon Synthesis According to Other Approaches

A variety of other methods may be used to produce nanoballoons (e.g., Ni metal, $TiO_2$, $ZrO_2$, $Al_2O$, $SiO_2$, CoO and chalcogenide nanoballoons). One approach is to polymer nanoparticles and coat those with the desired material followed by dissolution of the polymer core (polystyrene dissolved with toluene). This can be performed using a procedure like the method utilized by the Ag template approach.

Micro- and Nanocellular Solids for Thermal Insulation

Closed cell foams exhibit the lowest thermal conductivity of any conventional non-vacuum insulation. Several factors combine to limit heat flow in foams:

Low volume fraction of the solid phase

Small cell size which virtually suppresses any convection

Reduced radiation through repeated reflection and absorption at the cell walls

Naturally low conductivity of the enclosed gas

These factors result in excellent insulating properties and are exploited in the insulation for liquid oxygen rocket tanks and refrigerated trucks. Every day, railroad cars and tankers lined with such foam insulation transport large amounts of liquefied natural gas around the world, which would be impossible to do without it.

The specific heat per volume for foam is low compared to the original bulk material. The coefficient of thermal expansion of most foam materials is about the same as that of the bulk material, but the modulus of elasticity is significantly reduced, resulting in much smaller thermal stresses generated by high temperature gradients. This gives this class of materials rather good thermal shock resistance as well as fracture toughness. This is caused by the increased flexibility of the struts between the cells which is the higher the thinner the struts are.

In one aspect, foams have good thermal insulation properties. This is due to the fact that the four contributing factors to conducting heat are almost perfectly minimized in a foam structure:

Convection within the cells is almost completely suppressed due to the small cell size.

Radiation across the cells and through the cell walls is minimized by the cell size and shape which maximizes scattering, multiple reflections and repeated absorption and reemission.

Conduction through the solid phase is minimized by the small strut cross section generating resistance to heat flow like a very thin conductor or a very narrow liquid feed line. In addition, the cellular structure creates a torturous flow that lengthens the path the heat needs to travel to pass through the insulation.

Conduction through the gas in the pores is usually the path with the lowest thermal conductivity and many foams approach that ideal limit. It is further reduced under low pressure conditions.

In the following example, standard polyurethane foam is used to illustrate the magnitude of these four heat transfer mechanisms relative to each other.

Such a foam, with a relative density of 0.025 containing air at 1 atmosphere, exhibits a measured bulk thermal conductivity of 0.03 W/m*K. Very little of the thermal conductivity originates from the solid conduction term, which is the product of the bulk solid thermal conductivity and its volume fraction multiplied by an assumed efficiency factor (0.666), which takes into account the tortuous flow path through the cell walls. This results in a thermal conductivity of 0.003 W/m*K. From this, it can be concluded that the biggest contributor from conduction is via the gas phase. The conductivity of air at ambient pressure multiplied by its volume fraction gives 0.024 W/m*K. The sum of the solid and gas phase thermal conductivity (0.027 W/m*K) accounts for ~90% of the measured bulk conductivity of the foam.

Convection and radiation processes are described below.

Convection becomes a significant factor only when the Grashof number is greater than about 1000 corresponding to a cell size of about 10 mm. The Grashof number (GRN) describes the ratio of buoyant force driving convection to the viscous force opposing it and is used as a gauge for the convection component. It is defined by:

$$GRN = g\beta \Delta T_c l^3 \rho^2 \mu^{-2}$$

where g=acceleration: 9.81 m/s$^2$

β=volume coefficient of expansion for the respective gas (1/T)

ΔT=temperature differential across a single cell (10° C. with T=300° K)

l=cell diameter

ρ=gas density (air: 1 kg/m$^3$)

μ=dynamic viscosity of the cell gas (2×10$^{-5}$ Ns/m$^2$)

The Grashof number is not sensitive to the precise values of the variables and has been confirmed by experiment. Since the cell size in most foams is much smaller than that the convection lower limit (by a factor of 10 or more), it confirms that convection is completely suppressed especially in nanocellular structures according to one aspect of the disclosure.

Radiation on the other hand can contribute significantly and depends on the optical properties of the foam material. The unique pore structure increases electromagnetic wave reflection, scattering and the number of refractions. This maximizes the number of transitions between media with different refractive indices (gas phase in the cells and the solid cell material). Additional optical effects start to occur when the pore size is near the wavelength of the electromagnetic radiation trying to pass through.

At elevated temperatures, especially reentry conditions, the vehicle surface heats up and glows. In one aspect, the heat is transferred primarily by radiation. The foam structure enhances reflection, scatter and absorption of the thermal radiation due to its cellular structure. This effectively blocks radiative heat transmission. The smaller the cells, the more these optical properties are enhanced, reaching a maximum at a certain size that depends on the maximum temperature, i.e., the peak of the black body radiation curve, and the wavelength of that radiation range.

Investigations on fibrous insulation found a strong correlation between the backscattering of a given material and its insulating properties. It was found that the higher the backscattering, the better the thermal insulation properties. This in turn could be tied to the cross section of the fibers in the insulation. It has been shown that smaller fiber diameters lead to an increase in backscattering. This is of great importance, since radiative thermal conductivity is inversely proportional to the backscattering cross section. The ideal cross section was found to depend on the tested maximum surface temperature. This can be correlated to the respective wavelength of the maximum in the black body intensity plot. The wavelength maximum in the black body radiation plot shifts to shorter wavelengths with increasing temperature, changing its optical characteristics. In turn, the maximum backscattering shifts to a fibrous material with a smaller fiber diameter.

In one aspect of the disclosure, a foam structure behaves in a similar fashion, allowing transfer and application of those findings. The size of the pores replaces the fiber diameter above. According to one aspect of the disclosure, a nanoballoon thermal protection system (TPS) allows the tailoring and mixing of various sizes to maximize the backscattering of a wide range of wavelengths preventing that radiation from getting through the nanoballoon insulation layer.

The most thermally insulating foam found in nature is believed to be cork, with a thermal conductivity of just 0.045 W/m*K approaching the thermal conductivity of air, with 0.0259 W/m*K. The best man-made foams exhibit conductivity values on the order of air with thermal diffusivities (ratio of thermal conductivity to volumetric heat capacity) of around 1×10$^{-6}$ m$^2$/s. These aforementioned materials are unsuited for high temperature applications, but they illustrate what this type of structure is capable of, if this concept were to be used for high temperature materials and manufacture of these refractory ceramic foams with tailorable micro and nanostructures.

According to one aspect of the disclosure, a nanoballoon approach can create a structure that mimics the foam structures (such as cork, which has cells on the micro scale) and apply that to high temperature insulation application. In one aspect, a nanoballoon approach uses highly refractory materials, such as TaC, and optimizes them to the optical properties that give them high performance for a given temperature range.

Thermal Heat Transfer Estimation of Nanoballoon Insulative Coating

According to one aspect, a method is described below for estimating how fast heat can propagate through a nanoporous layer consisting of closed nanopores (or closed nanoballoons). The method focuses on a novel nanostructured material made from nanoballoons (e.g., nanospheres that are hollow inside). In this example, a diameter of 100 nm and a 50/50 solid-to-void fraction are chosen, since factors such as high temperature stability and weight are important.

The smaller the nanoballoons, the lower the temperature they would start to fuse and possibly collapse. Larger nanoballoons can have a thicker wall and still achieve 50% void volume while smaller nanoballoons would need thinner walls in order to achieve the same solid-to-void ratio. To achieve this ratio, 100 nm diameter nanoballoons would be needed with a maximum wall thickness of 10 nm. However, dense packing of perfect spheres in 3D fills in only about 66% of the space which already generates a 33% void volume. This would allow an increase in wall thickness to 15 nm and still give an overall 50/50 solid-to-void ratio. This may represent an ideal situation and may be rarely found in reality, but this provides a good starting point estimate.

For a set of heat flux data for five different points on the hot windward side of a reentry vehicle, the main heat flux is experienced within 20-22 seconds after which the thermal load goes back to almost zero. This data was used to estimate thermal soak-through for a nanoballoon thermal protection system (NBTPS) made of TaC.

During the previous estimate example, the heat flux was averaged over the entire reentry flight duration, since the simple model used does not allow for transient calculations. Such a scenario is rough and does not disclose how a NBTPS behaves during that short but intense thermal load period.

In this example, a 5 minute long reentry flight is broken into two sections: the hot period of 20-22 seconds in which the majority of the heat flux is encountered and the remaining 4 minutes and 40 seconds (the "cool" period) with no additional heat load. This cool period is of importance, since the hot surface of the vehicle continues to soak heat through the insulating layer even though the initial heat flux has stopped. One question to be answered is how much soak-through occurs in this time frame or more particularly what coating thickness is required to prevent the underlying aluminum structure from exceeding a 400° F. design limit.

In this example, the computation is performed in two steps. In the first step, the thermal conductivity of the insulating nanoballoon material is estimated, and in the second step, the thermal heat transfer through this material is determined at various thicknesses using a steady state equation, and this is correlated to the time it would take to heat a 0.13" thick aluminum base plate representing an actual vehicle frame structure.

In order to simplify this complex problem, two different approaches have been utilized in this example.

In the first approach, a more complex semi-infinite slab was used to compute transient heat flow. However, this model seems to work only for situations where no heat is lost, and all the heat enters the material and is conducted through the material. This may not accurately reflect what happens in the case, where significant heat losses (e.g., emittance, scatter) are taking place via radiation to the surrounding atmosphere.

In the second approach, a much simpler steady state approach was used. While this may be less accurate, a heat transfer behavior was successfully predicted.

(1) Procedure one. Estimation of thermal conductivity of nanoballoon material In order to estimate a reasonable thermal conductivity number for a TaC nanoballoon material, the following known equation is utilized, $$k_{eff} = \frac{4\sigma T^3 L}{\frac{2}{\varepsilon} - 1 + N'L} + \left[\frac{k_g}{1-f}\left(\frac{L_F}{L_F + L_G}\right)\right]_{P,T} + C_\rho$$

which is based on the assumption that the three heat transfer modes can be treated separately and their effects can be added via simple summation:

$$K_{eff} = k_{rt} + k_{sgc} + k_{ssc}$$

where
$k_{eff}$=overall effective conductivity
$k_{rt}$=radiation term
$k_{sgc}$=convection term
$k_{ssc}$=solid-solid conduction term According to one method, the mathematical details and real life correlations were developed based on porous fibrous insulation (e.g., shuttle type material) to understand how heat propagates through such a thermal protection system. It divides the heat transfer into the three familiar terms: conduction, convection and radiative heat transfer. The model was verified using extensive guarded hot plate measurements; however, accurate experimental data was obtained only for temperatures up to 980° C. (1800° F.).

When the model developed under the foregoing method was recreated and verified for its accuracy using the data obtained under the foregoing method, there were some issues with the convection term due to lack of certain input data. However, this does not affect the computation involved in the current example, since convection is not a factor in a closed-pore system. Therefore, it was reasonable to eliminate that term in the current computation example. Furthermore, the solid conduction term was also eliminated in the current example, since above about 1000-1200° C., heat is almost exclusively transferred by radiation. Solid-solid conduction contributes less than 5% at those temperatures in porous media and diminishes further with increasing temperatures. The temperature regime above about 1800° C. is of particular interest in the current example.

Therefore, the equation described above was reduced to the radiation term alone in the current example:

$$k_{eff} = k_{rt} = \frac{4\sigma T^3 L}{\frac{2}{\varepsilon} - 1 + N'L}$$

where
T=temperature
L=insulation thickness
N'=insulation bulk density dependent backscattering cross section
ε=emittance One key factor is the backscattering cross section, since it was found to be 100-1000 times larger than the absorption cross section. In other words, only 0.1% to 1% of thermal radiation is actually transferred by absorption-emittance mechanism, 99.9% to 99% is conducted via scattering by the porous materials. This needs to be measured since it depends on the specific structure more than the material itself. That is why a closed pore system can be so effective. It reduces the radiative heat transfer mechanism very effectively.

Another method demonstrated that fibrous insulation with fiber diameters of 1 micron can have a backscattering cross section of as much as 450-500 at temperatures around 800-1200° C.; no measurements were made at higher temperatures. There appears to be an optimum diameter (and fiber-to-fiber distance) for a given temperature resulting in the highest back scattering cross section. This can be related to the black body radiation plot at that temperature and the wavelength of the maximum spectral radiancy which shifts to shorter wavelengths with increasing temperature.

In a nanoballoon thermal protection system, the cavities with various sizes can provide a maximum of scattering centers blocking any radiation from direct shine-through. In one aspect of the disclosure, only after the solid walls have heated up to a high enough temperature to radiate by themselves can heat move forward. In addition, the carbides are opaque materials that do not allow significant shine-through even at elevated temperatures.

According to one aspect, TaC is used for the subject technology, since it has very high temperature capabilities with a melting point of about 3880° C. The high temperature stability is needed for the nanoballoon material to survive the operating conditions. Available TaC material parameters (e.g., density of 13.9 g/cm³, high temperature emissivity of 0.6) were used to estimate thermal conductivity, and an independent backscattering cross section of initially 300 was assumed. Since the void fraction is assumed to be 50%, an effective density of 6.95 g/cm³ was used for the calculations.

Table 5 lists the results. On the left are the input parameters. The next two columns contain the two parameters (i.e., independent backscattering and emissivity) that have been varied to illustrate how they affect thermal conductivity which is given in the last two columns (metric and English units, respectively).

where
k=thermal conductivity [W/m*K]
Q=rate of heat flow [W]
A=contact area baselined to 1 m²
d=distance of heat flow=layer thickness in our case
ΔT=temperature difference across insulation (hot surface–cold back face)

This approximation can be used since "thermal conductivity" is an intrinsic property of a homogeneous material. In this exemplary case, this is equated to relative or better

TABLE 5

| Table 1 | | | $K_{rt}$ [tantalum carbide] | | | (radiation) | | | |
|---|---|---|---|---|---|---|---|---|---|
| | Independent Backscattering | | dependent backscattering | | | | | Thermal Conductivity | |
| boltzmann $\sigma$ (J/K⁴-m²-s) 5.670E-08 | N (ft²/lb) | Emissivity | N' (1/ft) | N' (1/m) | $4\sigma T^3 * L$ | $2/\varepsilon - 1 + N'L$ | Temp (K) | $K_{rt}$ (W/mK) | $K_{rt}$ (BTU-in/lb-ft² - °F.) |
| | 50 | 0.5 | 21684 | 7.11E+04 | 9.001125 | 183.0333 | 2500 | 0.0492 | 0.341 |
| $\varepsilon$ | 100 | 0.5 | 43368 | 1.42E+05 | 9.001125 | 363.7333 | 2500 | 0.0247 | 0.172 |
| 0.6 | 150 | 0.5 | 65052 | 2.13E+05 | 9.001125 | 544.4333 | 2500 | 0.0165 | 0.115 |
| | 200 | 0.5 | 86736 | 2.85E+05 | 9.001125 | 725.1333 | 2500 | 0.0124 | 0.086 |
| L (m) (.1 in) | 250 | 0.5 | 108420 | 3.56E+05 | 9.001125 | 905.8333 | 2500 | 0.0099 | 0.069 |
| 0.00254 | 300 | 0.5 | 130104 | 4.27E+05 | 9.001125 | 1086.533 | 2500 | 0.0083 | 0.057 |
| | 300 | 0.7 | 130104 | 4.27E+05 | 9.001125 | 1086.533 | 2500 | 0.0083 | 0.057 |
| Insulation bulk Density (pcf) 433.68 | 300 | 0.9 | 130104 | 4.27E+05 | 9.001125 | 1086.533 | 2500 | 0.0083 | 0.057 |
| | 600 | 0.5 | 260208 | 8.54E+05 | 9.001125 | 2170.733 | 2500 | 0.0041 | 0.029 |
| | 600 | 0.7 | 260208 | 8.54E+05 | 9.001125 | 2170.733 | 2500 | 0.0041 | 0.029 |
| | 600 | 0.9 | 260208 | 8.54E+05 | 9.001125 | 2170.733 | 2500 | 0.0041 | 0.029 |
| Fiber Density (Spec Grav) 13.9 | 900 | 0.5 | 390312 | 1.28E+06 | 9.001125 | 3254.933 | 2500 | 0.0028 | 0.019 |
| | 900 | 0.7 | 390312 | 1.28E+06 | 9.001125 | 3254.933 | 2500 | 0.0028 | 0.019 |
| | 900 | 0.9 | 390312 | 1.28E+06 | 9.001125 | 3254.933 | 2500 | 0.0028 | 0.019 |
| | 1200 | 0.5 | 520416 | 1.71E+06 | 9.001125 | 4339.133 | 2500 | 0.0021 | 0.014 |
| J -> BTU 0.000947817 | 1200 | 0.7 | 520416 | 1.71E+06 | 9.001125 | 4339.133 | 2500 | 0.0021 | 0.014 |
| | 1200 | 0.9 | 520416 | 1.71E+06 | 9.001125 | 4339.133 | 2500 | 0.0021 | 0.014 |
| s -> hr 0.000277778 | 1800 | 0.5 | 780624 | 2.56E+06 | 9.001125 | 6507.533 | 2500 | 0.0014 | 0.010 |
| | 1800 | 0.7 | 780624 | 2.56E+06 | 9.011931 | 6507.533 | 2501 | 0.0014 | 0.010 |
| K -> F -457.87 | 1800 | 0.9 | 780624 | 2.56E+06 | 9.022745 | 6507.533 | 2502 | 0.0014 | 0.010 |

This calculation provides an estimate of what the (radiation based) thermal conductivity of this material would be at the high operating temperatures. Thermal conductivity of 0.025 W/m*K was selected in this example, since that is the thermal conductivity of air and would dominate the thermal conductivity of such a porous material if the solid contributes less than that. However, air would not have any affect on the radiation heat transfer, which is assumed to be the key transport mechanism. That would be exclusively governed by the solid materials properties, and it is possible that the overall thermal conductivity is higher than predicted by the model above since TaC as a material by itself has a bulk thermal conductivity of about 10 W/m*K at room temperature to about 40 W/m*K at 3000° C.

(2) Procedure Two. Estimation of Thermal Soak-Through and Time for Aluminum Structure to Reach 204° C. (400° F.) for Different Coating Thicknesses An estimate of the thermal conductivity of a TaC nanoballoon thermal protection system layer, as computed in procedure one above, can be used to estimate a heat transfer rate and possible back face temperature, as described further below.

For the heat flow rate calculations (one dimensional, steady state) through the insulating layer, the following Fourier's equation, known in the art, can be used:

$$Q = kA\Delta T/d$$

effective thermal conductivity for a given system (i.e., a nanoballoon thermal protection system layer).

The following values may be extracted from exemplary data: a hot period of 20 seconds, a dormant period of about 230 seconds, and a final warm up period at the end of about 50 seconds. The temperature profiles provided were used to extract temperature differentials for each second during the thermal spike, and the average values were used for the dormant period and the final warm up.

The rate at which heat is conducted through a material is proportional to the area normal to the heat flow, the thermal conductivity of the material and to the temperature gradient along the heat flow path. The area was normalized to 1 m² and the thermal conductivity was referenced to air and adjusted for the different temperatures.

Table 6 was generated to compute the average heat transfer rate per second (second column) for the hot period of about 20 seconds, the dormant period of about 230 seconds, and the final warm up period of about 50 seconds. The total thermal energy (third column) transferred for each of these periods was also calculated by multiplier time (first column) by the average heat transfer rate (second column). Then the total thermal energy amounts from the three periods were added up to arrive at the total thermal energy transferred during a nominal 5 minute reentry flight.

TABLE 6

| Time [sec] | Average Transfer Rate [kcal/sec] | Total Thermal Energy Transferred [kcal] |
|---|---|---|
| 20 | 20.758 | 457 |
| 230 | 2.436 | 560 |
| 50 | 5.357 | 268 |
|  |  | 1285 Total |

In this example for the hottest point (point A), the total thermal energy transferred through a 0.1" thick TaC nanoballoon thermal protection system layer per m² is 1285 kcal during the entire 5 minute reentry flight until the target is reached.

To determine how much energy is needed to heat 1 m² of a 0.13' thick aluminum plate, the mass of such a plate and its heat capacity were calculated as follows: Total mass of 0.13' thick aluminum plate 1 m² area=8.91 kg with a heat capacity of 0.215 cal/g*° C. results in a total energy of 354.4 kcal required to heat that mass to 400° F., which is the thermal design limit for such a structure.

Results obtained are shown below according to various aspects of the disclosure.

(1) Point A (Hottest Point)

This result shows that a 0.1" thick layer is too thin. The aluminum structure would exceed the 400° F. temperature limit within the first 20 seconds (compare 457 kcal with the 354 kcal max to reach 400° F.). Almost four times the energy is transferred through such a thin layer. Since the energy transferred drops by half when doubling the thickness, the 1285 kcal was divided by 354.4 kcal to find that at least a 0.36" thick (or rounded to a 0.4" thick) nanoballoon layer is needed to prevent the aluminum structure from overheating, i.e., exceeding the 400° F. design limit.

(2) Peak Heat Flux of 150 btu/ft2 Sec

For a peak heat flux of just 150 btu/ft² sec representative of the low heat impact areas, the heat flux per minute would be 73.8 kcal for 0.025 W/m*K thermal conductivity or 295 kcal for a thermal conductivity of 0.1 W/m*K. In the first case, it would take almost 5 minutes for the aluminum structure to reach 400° F., and in the second case 75 seconds. However, this heat flux heat is only present for about 20-30 seconds. Therefore, 0.1" thick nanoballoon layer would be sufficient according to one aspect.

(3) Peak Heat Flux of 1200 btu/ft2 sec

For a peak heat flux of just 1200 btu/ft² sec representative of the low heat impact areas, the heat flux per minute would be 252 kcal for 0.04 W/m*K thermal conductivity or 629 kcal for a thermal conductivity of 0.1 W/m*K. In the first case, it would take about 85 seconds for the aluminum structure to reach 400° F., and in the second case 34 seconds. However, this heat flux heat is only present for about 20-30 seconds. Therefore, 0.1-0.2" thick nanoballoon layer would be sufficient according to one aspect.

(4) Point B

This result shows that a 0.1" thick layer is too thin. The aluminum structure would already exceed the 400° F. temperature limit within the first 20 seconds (compare 369 kcal with the 354 kcal max to reach 400° F.). Since the energy transferred drops by when doubling the thickness, the total of 648 kcal is divided by 354.4 kcal to find that one would need at least a 0.18" thick or rounded a 0.2" thick nanoballoon layer to prevent the aluminum structure from overheating, e.g., exceeding the 400° F. design limit.

(5) Point C

This result shows that a 0.1" thick layer is too thin. The aluminum structure would almost reach the 400° F. temperature limit within the first 20 seconds (compare 327 kcal with the 354 kcal max to reach 400° F.). Since the energy transferred drops by ½ when doubling the thickness, the total of 560 kcal is divided by 354.4 kcal to find that one would need at least a 0.16" thick or rounded a 0.2" thick nanoballoon layer to prevent the aluminum structure from overheating, e.g., exceeding the 400° F. design limit.

(6) Point D and E

Since these locations experience similar heat fluxes as point C it would be safe to operate with a 0.2" thick layer as well.

This foregoing computation is an estimate only, since solid-solid conduction has not been taken into account and accurate backscattering data is not available. Furthermore, the formula used was a simplified formula, and it was deemed sufficient to obtain a first order of estimate.

According to one aspect of the disclosure, based on an estimated thermal conductivity of that of air, a layer thickness of 0.1" is insufficient to prevent overheating in most regions. A minimum layer thickness of at least 0.4" is needed in the hottest zone (point A). For the other areas, e.g., mid-cone and extension sections, 0.2" thick nanoballoon could be sufficient. This data indicates that a nanoballoon layer approach of the subject technology provides significant advantages. A 100 lb weight savings may be achievable.

Figure 17:
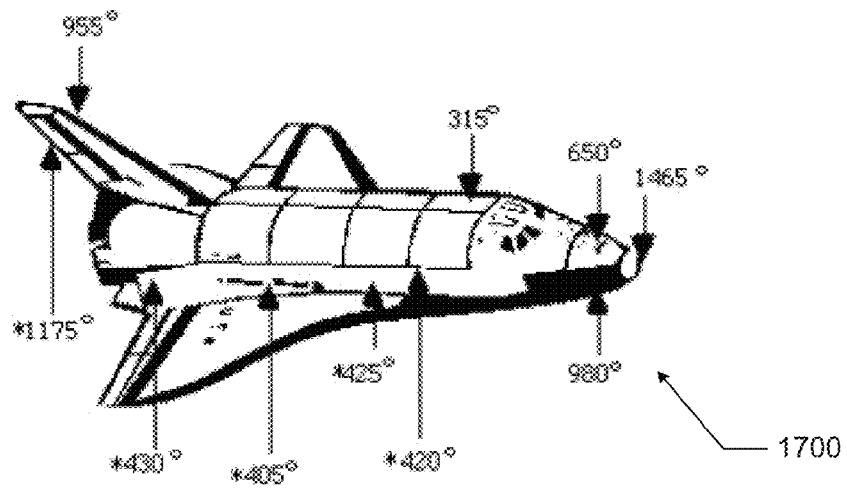
FIG. 17 shows an example of a vehicle in accordance with one aspect of the disclosure.

FIG. 17 shows an example of a vehicle and the temperatures each section of the vehicle may experience at reentry. The temperatures are in Celsius degrees. Temperatures marked with an asterisk (*) signify ascent temperatures. In this example, the nose tip section of vehicle 1700 may experience a temperature of 1465° C. In one aspect, appropriate foam coating materials (e.g., appropriate nanoballoon materials) need to be selected for each section to withstand the temperature. In one aspect, different materials can be used for each section.

According to one aspect of the disclosure, optimum foam coating materials may be determined for different portions of a vehicle. For example, different nanoballoon materials may be utilized for the windward and leeward sides for the nose tip, mid body, and aft section. The lowest density nanoballoon material and thickness may be determined for each of the six locations.

In one aspect of the disclosure, this can be done based on approximations of the thermal properties for a variety of materials (such as carbides and oxides). The thermal properties can be used in a thermal simulator, such as IDEAS TMG, where the heat flux as a function of time is applied against a flat plate. Based on this analysis, the required thickness to achieve the required back wall temperature for each material at each of the six points can be determined. This information can allow one to select the proper material for each location of the reentry body, minimizing the overall weight of the vehicle.

According to one aspect of the disclosure, depending on the exact mass balance of the three areas, TaC nanoballoons may be placed on the forecone and lighter nanoballoons for mid-cone and extension section to save at least 100 lbs with the potential for more. Suitable materials needs to have a melting point, above 2200° C. and a density around 5 g/cm³ such as titanium carbide (TiC, m.p.: 3140° C., density: 4.93 g/cm³), silicon carbide (SiC, 2700° C., density: 3.1 g/cm³) and high melting oxides such as $HfO_2$ m.p.: 2758° C.) or $ZrO_2$ (m.p.: 2715° C.) and others.

Figure 18:
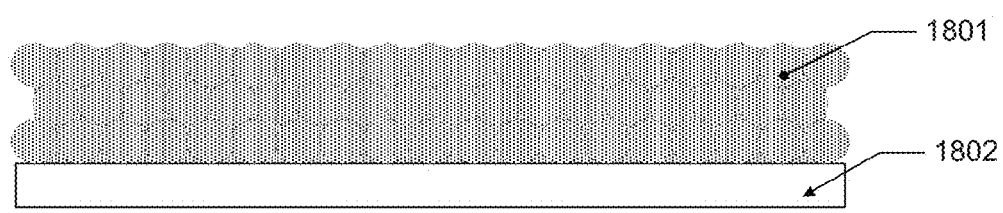
FIG. 18 illustrates an example of a nanoballoon thermal protection system on a substrate in accordance with one aspect of the disclosure.

FIG. 18 illustrates an example of a nanoballoon thermal protection system on a substrate in accordance with one aspect of the disclosure. A nanoballoon thermal protection system 1801 is adhered to a substrate 1802 (e.g., a surface of vehicle 1700). In one aspect, nanoballoon thermal protection system 1801 comprises a foam coating comprised of nanoballoons fused together. In one aspect, the foam coating has a closed cell structure not allowing liquid to penetrate through the foam coating (e.g., from outside to the side of the substrate and vice versa). In one aspect, the foam coating has no matrix of bonding materials between the nanoballoons. While the fused nanoballoons are shown here as spherical shape simply for illustration purposes, but the fused nanoballoons may be in other shapes that are hollow.

Figure 19A:
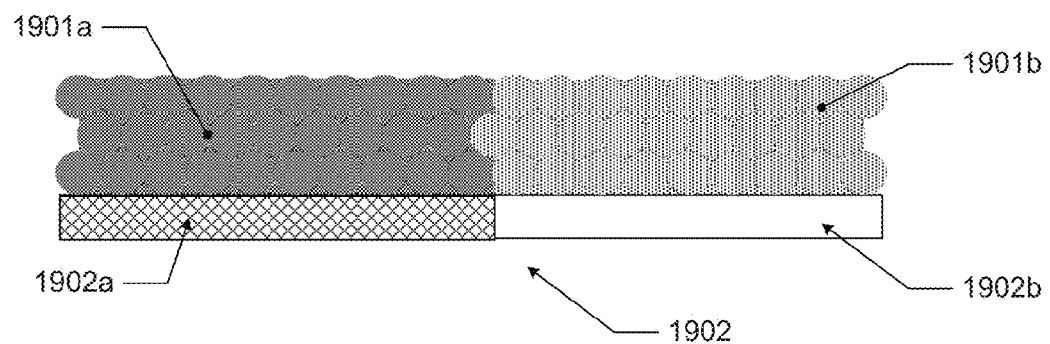
FIG. 19A illustrates an example of a nanoballoon thermal protection system on a substrate in accordance with another aspect of the disclosure.

FIG. 19A illustrates an example of a nanoballoon thermal protection system on a substrate in accordance with another aspect of the disclosure. According to one aspect of the disclosure, a vehicle (e.g., 1700) with thermal shield comprises a surface (e.g., 1902) comprising a plurality of sections (e.g., the foregoing six locations on a reentry vehicle). The plurality of sections comprises a first section (e.g., 1902a; nose tip) and a second section (e.g., 1902b; mid body). The vehicle further comprises a first nanoballoon closed cell foam coating (e.g., 1901a) fused to the first section and a second nanoballoon closed cell foam coating (e.g., 1901b) fused to the second section.

The first nanoballoon closed cell foam coating may have the melting point temperature greater than 1000° C. (e.g., greater than 3000° C.) and the density greater than 0% and less than 85%. The first nanoballoon closed cell foam coating comprises a plurality of first balloons. Each of the first balloons is hollow and has a diameter greater than 0 nm and less than 900 nm. The first balloons are fused together. The first nanoballoon closed cell foam coating comprises a closed cell structure not allowing liquid to penetrate through the first nanoballoon closed cell foam coating. The second nanoballoon closed cell foam coating may have characteristics similar to those of the first nanoballoon closed cell foam coating but may have a different melting point temperature (e.g., lower).

Figure 19B:
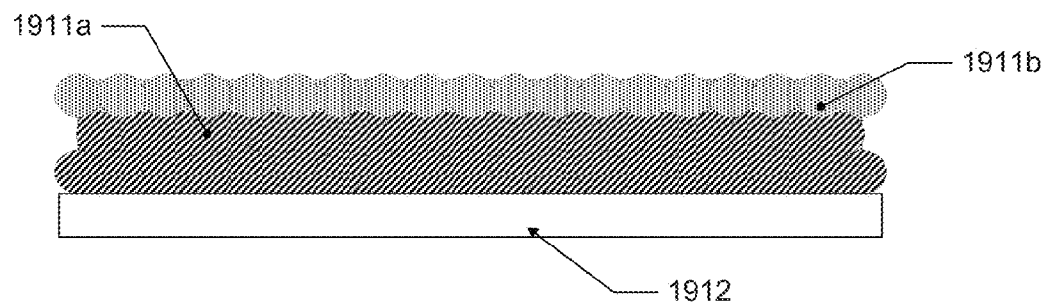
FIG. 19B illustrates another example of a nanoballoon thermal protection system on a substrate in accordance with another aspect of the disclosure.
Figure 20:
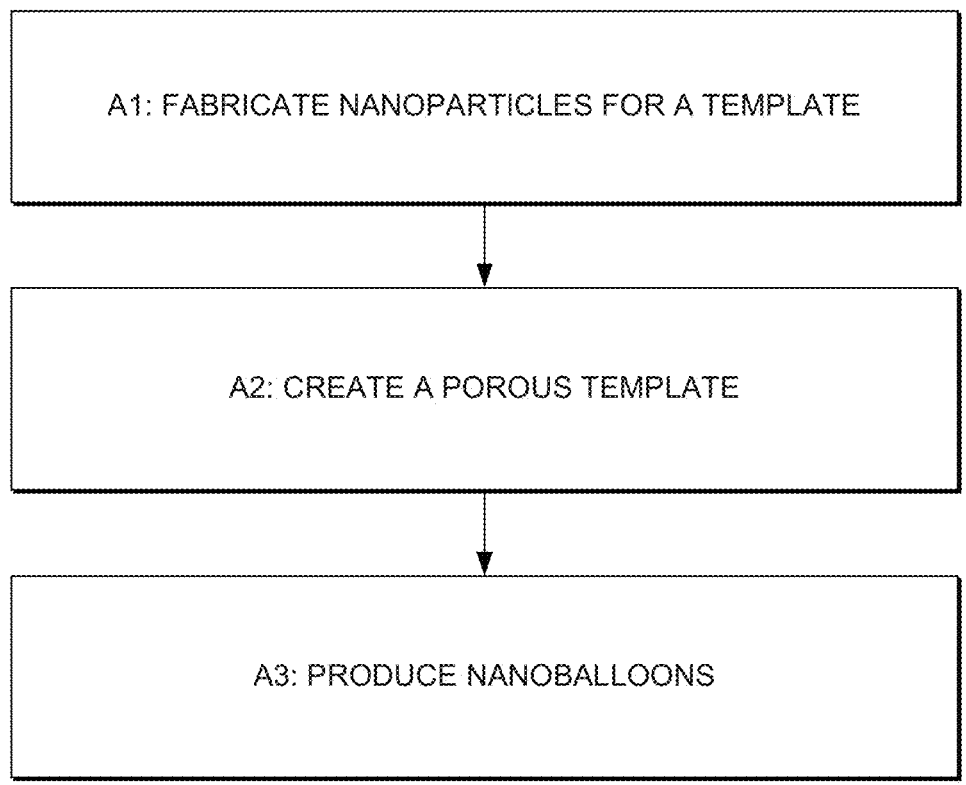
FIG. 20 illustrates an example of a flow chart for fabricating nanoballoons in accordance with one aspect of the disclosure.
Figure 21A:
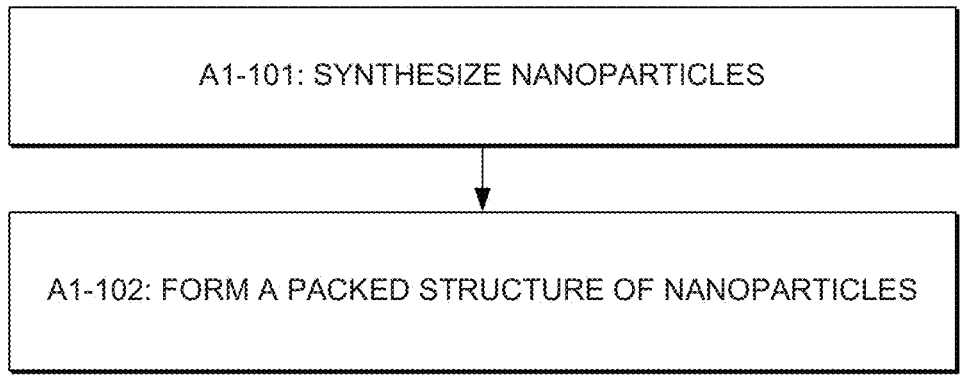
FIGS. 21A, 21B and 21C illustrate an example of flow charts for fabricating nanoballoons in accordance with one aspect of the disclosure.
Figure 21B:
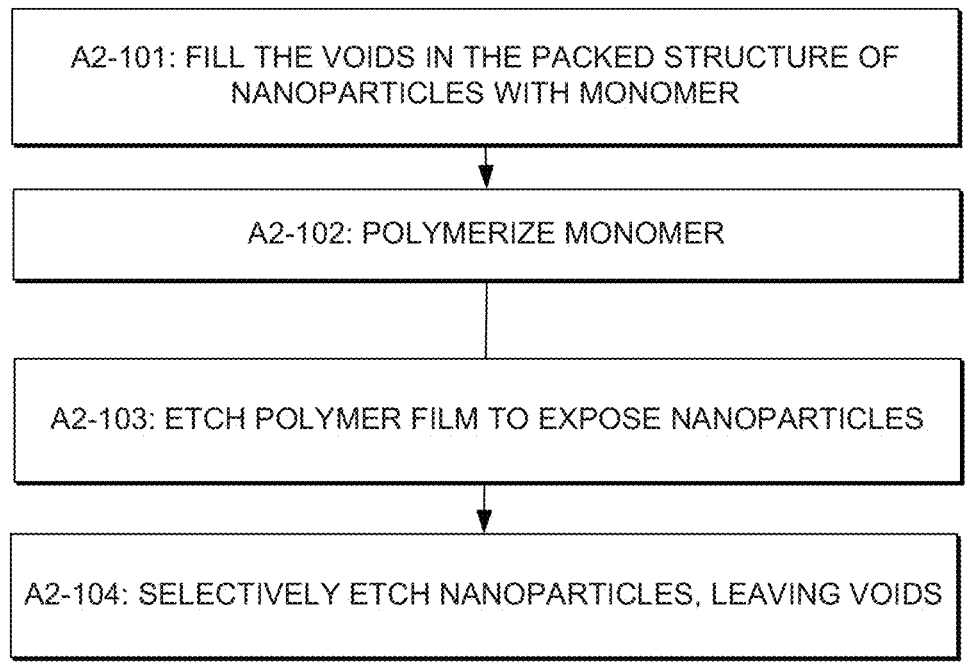
Figure 21C:
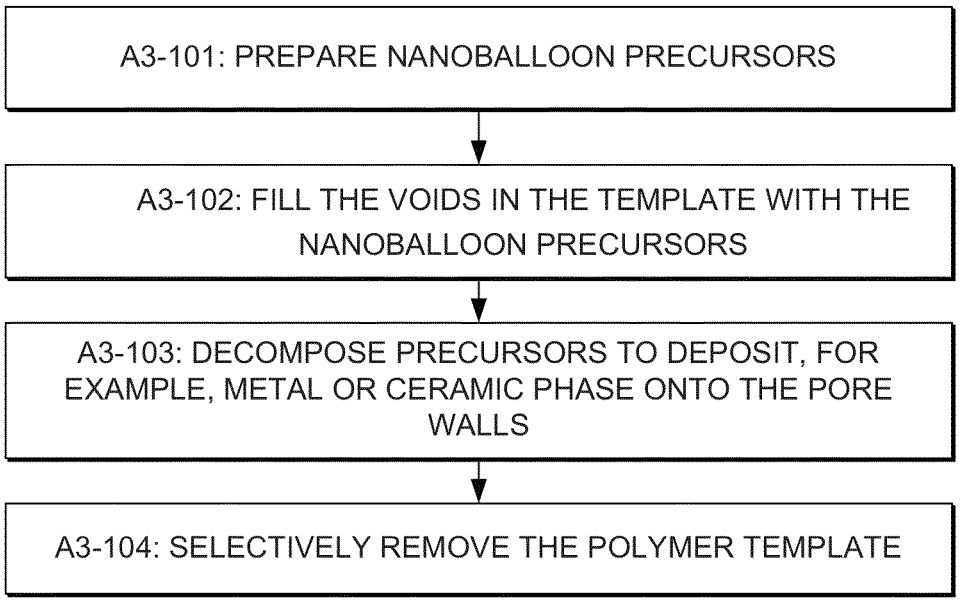

FIG. 19B illustrates another example of a nanoballoon thermal protection system on a substrate in accordance with another aspect of the disclosure. According to one aspect of the disclosure, a vehicle (e.g., 1700) with thermal shield comprises a surface (e.g., 1912). The vehicle further comprises a first nanoballoon closed cell foam coating (e.g., 1911a) fused to the surface and a second nanoballoon closed cell foam coating (e.g., 1911b) fused to the first nanoballoon closed cell foam coating.

The first nanoballoon closed cell foam coating may have a first melting point temperature and a first density. The first nanoballoon closed cell foam coating comprises a plurality of first balloons. Each of the first balloons is hollow and has a diameter greater than 0 nm and less than 900 nm. The first balloons are fused together. The first nanoballoon closed cell foam coating comprises a closed cell structure not allowing liquid to penetrate through the first nanoballoon closed cell foam coating. The second nanoballoon closed cell foam coating may have characteristics similar to those of the first nanoballoon closed cell foam coating but may have a second melting point temperature and a second density. In one example, it is advantageous for the second melting point temperature to be higher than the first melting point temperature, and it is advantageous for the second density to be higher than the first density. In other examples, the first melting point temperature and the second melting point temperature may be the same or different, and the first density and the second density may be the same or different.

According to one aspect of the disclosure, the term "closed cell" may refer to a configuration where liquid (e.g., gas, air, water, solvent) cannot penetrate through the closed cell structure. In one aspect, liquid may penetrate a few layers of the closed cell structure on the side exposed to the liquid, but the liquid does not come out of the other side of the closed cell structure. In one aspect, less than 10% (e.g., 1%, 2%, 5% or any number less than 10%) of liquid penetrates through the closed cell structure. In one aspect, a closed cell structure is not an open cell structure, and is not a filter. In one aspect, a closed cell structure does not have channels for liquid to penetrate through the entire structure. In one aspect, a closed cell structure does not sink in water, while an open cell structure sinks in water.

According to one aspect of the disclosure, the term "diameter" of a structure does not imply that the structure needs to be spherical. In one aspect, the term "diameter" may refer to a dimension of a cross section. In one aspect, the term "diameter" may refer to a dimension of the largest cross section of the structure. In one aspect, the term "diameter" may refer to a size of the structure.

According to one aspect of the disclosure, each nanoballoon may have a diameter greater than 0 nm and less than 1000 nm (e.g., 50 nm, 60 nm, 70 nm, 100 nm, 150 nm, 200 nm, 230 nm, 400 nm, 900 nm, or any number less than 1000 nm), and each nanoballoon is hollow. In one aspect, the diameter is about 100 nm. In another aspect, the diameter is between 100 and 200 nm. The uniformity of the diameters of nanoballoons (or the uniformity of the size distribution of the nanoballoons) may be less than +/−20% (e.g., 100 nm+/−10 to 15%; 100 nm+/−15%; 400 nm+/−10%; 900 nm+/−5%; or any other percentage less than 20%). In one aspect, each nanoballoon may have a wall thickness greater than 0 nm and less than 50 nm (e.g., 5 nm, 10 nm, 20 nm, 40 nm, or any number less than 50 nm; any range of numbers greater than 0 nm and less than 50 nm). In one aspect, the wall thickness is about 10 nm. In another aspect, the wall thickness is between 5 and 20 nm. In yet another aspect, the wall thickness is between 5 and 40 nm. In one aspect, a small wall thickness is preferred to produce a light-weight structure.

According to one aspect of the disclosure, a foam coating may have a thickness greater than 0" and less than 1" (e.g., a few mm, 0.1", 0.2", 0.3", 0.4", or any number less than 1"). In one aspect, the thickness is about 0.2". In another aspect, the thickness is about 0.4". In one aspect, a foam coating is fused together as one solid piece that is deformable. In one aspect, a foam coating does not contain individual nanoballoons. In one aspect, a small thickness is preferred to produce a light-weight structure.

According to one aspect of the disclosure, the term "density" may refer to a percentage represented by the amount of solid vs. the total amount (solid and void). In one aspect, a foam coating has a density greater than 0% and less than 90% (e.g., any percentage between 0 and 90%). In another aspect, the density is about 50%. In another aspect, the density is less than 85%. In yet another aspect, the density is less than 60%. In one aspect, a low density is preferred to produce a light-weight structure.

According to one aspect of the disclosure, a foam coating may comprise nanoballoons comprised of one or more metals, oxides, carbides, or a combination thereof. In one aspect, metals may be refractory metals such as tungsten, molybdenum, niobium, tantalum, rhenium, and iridium. In another aspect, metals may be nickel or other metals. In one aspect, oxides may be refractory oxides. In one aspect, examples of oxides include $Sc_2O_3$, $Y_2O_3$, $La_2O_3$, CaO, SrO, BaO, $TiO_2$, $ZrO_2$, $HfO_2$, $ThO_2$, $Ta_2O_5$, $Cr_2O_3$, $Fe_2O_3$, CoO, NiO, and all lanthanide oxides. Other oxide examples may be $Al_2O_3$, and $SiO_2$. In one aspect, carbides and mixed metal carbides can be refractory carbides (e.g., TaC, HfC, NbC, ZrC and TiC; $Ta_4HfC_5$).

According to another aspect of the disclosure, a foam coating may comprise nanoballoons comprised of one or more types of chalcogenides. According to yet another aspect of the disclosure, a foam coating may comprise nanoballoons comprised of one or more types of ceramic materials. In one aspect, a ceramic material may be an inorganic, non-metallic material. In one aspect, a ceramic material may be a metal oxide, metal nitride, metal carbide, metal boride, or metal silicide. In one aspect, a ceramic material may be a refractory ceramic material. It should be noted that these foam coating/nanoballoon materials are examples, and the subject technology is not limited to these examples.

According to one aspect of the disclosure, a foam coating of the subject technology includes ceramic foams used in heat shields. Such ceramic foams are less likely to thermally spall compared to the pure (bulk) solid it is made of.

According to one aspect of the disclosure, a foam coating of the subject technology is an important technology enabler for various reentry vehicles and other vehicles that may need light-weight, high-temperature thermal shields.

According to one aspect, the term "vehicle" may refer to a space shuttle, airplane, spacecraft, transporter, or other types of vehicles. In another aspect, the term "vehicle" may refer to one or more structures or components. According to one aspect, the term "nanoporous cell" may be sometimes referred to as nanoballoon, nanoporous, or vice versa.

According to one aspect of the disclosure, a form coating of the subject technology may be a thermal barrier coating (TBC) for turbine blades and/or other components exposed to high temperatures and corrosive environments as found in exhaust systems such as power plants, turbines, and other combustion engines.

According to one aspect of the disclosure, the following examples of advantageous/distinguishable features are noted:—The initial colloid size of the subject nanoballoons are much smaller than the sizes of a prior approach.
  In one aspect, to fabricate smaller silica colloid, several syntheses were prepared and provided an understanding of how precursor parameters affected silica colloid growth and stabilization
The deposition method (e.g., Step A1-102) of forming nanoparticles for a template with silica colloid is better than a prior approach. Examples include a filtration method and a centrifugation method.
  Filtration method
    In one aspect, colloid was filtered through a glass frit and the filtrand remaining on the filter was the colloidal film used for a template
  Centrifugation method
    In one aspect, colloid was centrifuged to form a compact pellet, which was then transferred to a substrate where it was dried in a vacuum oven in preparation for polymer infiltration
Polymerization (e.g., Step A2-102) is utilized.
  In one aspect, polystyrene polymerization was used for $TiO_2$ nanoballoons, polystyrene polymerized by thermal polymerization of styrene using benzoyl peroxide as the initiator
  In one aspect, polymer material and polymerization process will vary based upon affinity for specific nanoballoon precursors to be used
Specific etch chemistry is utilized to remove silica from a polymer template.
  In one aspect, specific amounts and concentrations of hydrofluoric acid were used to remove silica
  In one aspect, access to silica is enabled by three methods
    A plasma etch was used to remove polymer from outer surface to expose silica (Oxygen/$CF_4$ mixture used for plasma)
    Polymer surface was removed with chemical to expose silica (acetone and toluene used)
    Breaking up the pellets to produce large fracture surfaces to expose the silica template particles.
Nanoballoon precursor addition to a porous polymer template is material-dependent.
  In one example, titania precursor is titanium alkoxide that is prepared in ethanol.
  Polymer template is immersed in precursor solution, and then reacted by exposure to air for 30 min.
  In another example, the tantalum precursor tantalum pentachloride is dissolved in THF or glyme in the presence of a surfactant. Polymer template is immersed in precursor solution, and then decomposed by raising the temperature.
  In yet another example, the tantalum precursor penta ethyl tantalum is prepared in THF with or without the presence of a surfactant. Polymer template is immersed in precursor solution, and then decomposed by raising the temperature.
  In one aspect, the wall thickness of a nanoballoon can be controlled by multiple immersions and variation of precursor concentration.
Polymer removal occurs by either chemical or thermal treatment, depending upon nanoballoon composition.
  In one aspect, polymer was removed chemically by either acetone or toluene
  In one aspect, polymer was removed thermally by placing sample in furnace and heating to 450° C.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. While the subject technology has been particularly described with reference to the various figures, aspects and configurations, it should be understood that these are for illustration purposes only and should not be taken as limiting the scope of the invention.

Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa.

Headings and subheadings are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. A phrase such as an "embodiment" does not imply that such embodiment is essential to the subject technology or that such embodiment applies to all configurations of the subject technology. A disclosure relating to an embodiment may apply to all embodiments, or one or more embodiments.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is the following:

1. A method comprising:
    fabricating a packed structure of nanoparticles, the fabricating comprising:
        filtering or centrifuging nanoparticles, wherein each nanoparticle of the packed structure has a diameter greater than 0 nm and less than 1000 nm;
    creating a porous polymer template, the creating comprising:
        filling voids in the packed structure of nanoparticles with a monomer;
        polymerizing the monomer; and
        selectively removing the packed structure to leave a porous polymer template having voids therein; and
    producing tantalum carbide nanoballoons in the voids of the porous polymer template, the producing comprising:
        preparing nanoballoon precursors by dissolving tantalum oxide in an aqueous solution and forming $NaTaO_3$;
        filling voids in the porous polymer template with the nanoballoon precursors;
        converting the nanoballoon precursors into tantalum nanoparticles in the voids of the porous polymer template by reducing the $NaTaO_3$;
        converting the tantalum nanoparticles into tantalum carbide nanoballoons in the voids of the porous polymer template; and
        selectively removing the porous polymer template;
    wherein each of the tantalum carbide nanoballoons is hollow and has a diameter greater than 0 nm and less than 1000 nm, the tantalum carbide nanoballoons being agglomerated.

2. The method of claim 1, further comprising:
    formulating a nanoballoon solvent mixture, the nanoballoon solvent mixture comprising the tantalum carbide nanoballoons and a solvent;
    consolidating the tantalum carbide nanoballoons; and
    producing a nanoballoon closed cell foam coating, the nanoballoon closed cell foam coating comprising a closed cell structure not allowing liquid to penetrate through the nanoballoon closed cell foam coating.

3. The method of claim 1, further comprising:
    formulating a nanoballoon solvent mixture, the nanoballoon solvent mixture comprising the tantalum carbide nanoballoons and a solvent;
    directly applying the nanoballoon solvent mixture onto a substrate;
    consolidating the tantalum carbide nanoballoons together with the substrate; and
    producing a nanoballoon closed cell foam coating fused on the substrate, the nanoballoon closed cell foam coating comprising a closed cell structure not allowing liquid to penetrate through the nanoballoon closed cell foam coating.

4. The method of claim 1, wherein the tantalum nanoparticles are converted into the tantalum carbide nanoballoons at a temperature less than 1000° C.

5. The method of claim 1, wherein the tantalum carbide nanoballoons have a diameter greater than 0 nm and less than 150 nm.

6. The method of claim 1, wherein fabricating the packed structure comprises centrifuging the nanoparticles.

7. The method of claim 1, wherein creating the porous polymer template further comprises removing a polymer film from an outer surface of the porous polymer template to expose the nanoparticles.

8. The method of claim 1, wherein preparing nanoballoon precursors further comprises:
    adding sodium chloride so as to precipitate the $NaTaO_3$.

9. The method of claim 1, wherein the $NaTaO_3$ is reduced using tri-ethyl-aluminum.

10. The method of claim 1, wherein the nanoparticles of the packed structure comprise aluminum or silicon.

11. A method comprising:
    fabricating a packed structure of nanoparticles, each nanoparticle of the packed structure having a diameter greater than 0 nm and less than 1000 nm;
    creating a porous polymer template having voids therein by using the packed structure of nanoparticles; and
    producing tantalum carbide nanoballoons in the voids of the porous polymer template, each of the metal carbide nanoballoons being hollow and having a diameter greater than 0 nm and less than 1000 nm;
    wherein producing comprises:
        dissolving tantalum oxide in an aqueous solution;
        adding sodium chloride to precipitate $NaTaO_3$ in a nanoform;
        reducing the $NaTaO_3$ with tri-ethyl-aluminum to form tantalum nanoparticles; and
        converting the tantalum nanoparticles into tantalum carbide nanoballoons in the voids of the porous polymer template.

12. The method of claim 11, further comprising:
    drying the $NaTaO_3$ before reducing it with the tri-ethyl-aluminum.

13. The method of claim 11, wherein the tantalum nanoparticles are formed in the presence of a surfactant.

14. The method of claim 11, further comprising:
    formulating a nanoballoon solvent mixture, the nanoballoon solvent mixture comprising the tantalum carbide nanoballoons and a solvent;
    consolidating the tantalum carbide nanoballoons; and
    producing a nanoballoon closed cell foam coating, the nanoballoon closed cell foam coating comprising a closed cell structure not allowing liquid to penetrate through the nanoballoon closed cell foam coating.

15. The method of claim 11, further comprising:
formulating a nanoballoon solvent mixture, the nanoballoon solvent mixture comprising the tantalum carbide nanoballoons and a solvent;
directly applying the nanoballoon solvent mixture onto a substrate;
consolidating the tantalum carbide nanoballoons together with the substrate; and
producing a nanoballoon closed cell foam coating fused on the substrate, the nanoballoon closed cell foam coating comprising a closed cell structure not allowing liquid to penetrate through the nanoballoon closed cell foam coating.

16. The method of claim 11, wherein the tantalum nanoparticles are converted into the tantalum carbide nanoballoons at a temperature less than 1000° C.

17. The method of claim 11, wherein the tantalum carbide nanoballoons have a diameter greater than 0 nm and less than 150 nm.

* * * * *